(12) United States Patent  (10) Patent No.: US 7,946,500 B2
Nishizawa et al.  (45) Date of Patent: May 24, 2011

(54) MEMORY CARD AND SEMICONDUCTOR DEVICE

(75) Inventors: Hirotaka Nishizawa, Fuchu (JP); Akira Higuchi, Takasaki (JP); Kenji Osawa, Hachioji (JP); Junichiro Osako, Kodaira (JP); Tamaki Wada, Higashimurayama (JP); Michiaki Sugiyama, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 692 days.

(21) Appl. No.: 11/957,469

(22) Filed: Dec. 16, 2007

(65) Prior Publication Data

US 2008/0272197 A1  Nov. 6, 2008

Related U.S. Application Data

(63) Continuation of application No. 10/960,995, filed on Oct. 12, 2004, now Pat. No. 7,325,746.

(30) Foreign Application Priority Data

Nov. 4, 2003 (JP) ................................. 2003-374237

(51) Int. Cl.
 *G06K 19/06*  (2006.01)
(52) U.S. Cl. ........................................ 235/492; 235/441
(58) Field of Classification Search .................. 235/492, 235/486, 487, 441, 380; 455/558, 90.3, 333
 See application file for complete search history.

(56) References Cited

U.S. PATENT DOCUMENTS

| | | | |
|---|---|---|---|
| 6,199,756 B1 | 3/2001 | Kondo et al. | |
| 6,381,143 B1 | 4/2002 | Nakamura | |
| 6,573,567 B1 | 6/2003 | Nishizawa et al. | |
| 6,641,413 B2 | 11/2003 | Kuroda | |
| 6,669,487 B1 | 12/2003 | Nishizawa et al. | |
| 6,700,788 B2 | 3/2004 | Matsushita et al. | |
| 6,824,063 B1 | 11/2004 | Wallace et al. | |

(Continued)

FOREIGN PATENT DOCUMENTS

JP  2003-91704 A  3/2003

(Continued)

OTHER PUBLICATIONS

MultiMediaCard System Specification, Version 3.3, Official Release Mar. 2003, pp. 54-63.

*Primary Examiner* — Thien M Le
(74) *Attorney, Agent, or Firm* — Miles & Stockbridge P.C.

(57) ABSTRACT

An antenna connection function for a noncontact interface is provided by suppressing a modification in a pin arrangement and a pin shape of a memory card that does not correspond to the noncontact interface. Two antenna connecting pins having the memory card are divided into two areas in which a size of one potential supply pin is the largest and used as a split pin arranged at intervals. Because a size of the two antenna connecting pins is at maximum as large as the size of the potential supply pin, the two antenna connecting pins are provided and the memory card that corresponds to the noncontact interface is obtained by devoting a pin area having the size of the one potential supply pin to the memory card that does not correspond to the noncontact interface. Accordingly, the pin area of the memory card that corresponds to the noncontact interface can be formed without departing from the pin area of the memory card that does not correspond to the noncontact interface.

8 Claims, 21 Drawing Sheets

U.S. PATENT DOCUMENTS

| | | |
|---|---|---|
| 6,834,810 B2 | 12/2004 | Maruyama |
| 6,932,654 B2 | 8/2005 | Washino |
| 6,972,979 B2 | 12/2005 | Iida et al. |
| 7,009,846 B1 | 3/2006 | Wang et al. |
| 7,107,378 B1 | 9/2006 | Brewer et al. |
| 7,325,746 B2 * | 2/2008 | Nishizawa et al. ........... 235/492 |
| 7,341,198 B2 * | 3/2008 | Nishizawa et al. ........... 235/492 |
| 7,389,397 B2 * | 6/2008 | Paley et al. ................... 711/170 |
| 7,572,152 B2 * | 8/2009 | Mosek et al. ................. 439/631 |
| 2004/0203536 A1 * | 10/2004 | Chao et al. ................... 455/90.3 |
| 2005/0094463 A1 * | 5/2005 | Nishizawa et al. ........... 365/222 |
| 2006/0142063 A1 * | 6/2006 | Monsacre ..................... 455/558 |
| 2006/0208066 A1 * | 9/2006 | Finn et al. ..................... 235/380 |
| 2007/0272761 A1 * | 11/2007 | Ayala et al. ................... 235/492 |
| 2008/0201264 A1 * | 8/2008 | Brown et al. ................... 705/67 |
| 2008/0242355 A1 * | 10/2008 | Yu et al. ........................ 455/558 |

FOREIGN PATENT DOCUMENTS

WO  WO 01/84490 A1  11/2001

\* cited by examiner

FIG. 2

| | (IN CASE OF 13 pins) DEFINITION A | (IN CASE OF 14 pins Dual) | | (IN CASE OF 7 pins) DEFINITION D | (IN CASE OF 7 pins + 4 pins) DEFINITION E | (IN CASE OF 15 pins Dual) DEFINITION F |
|---|---|---|---|---|---|---|
| | | (8-bit BUS) DEFINITION B | (4-bit BUS) + (CONTACT IC CARD) DEFINITION C | | | |
| C1 | DAT3 | DAT3 | DAT3 | RSV | DAT3 | DAT3 |
| C2 | CMD | CMD | CMD | CMD | CMD | CMD |
| C3 | Vss | Vss | Vss | Vss | Vss | Vss |
| C4 | Vcc | Vcc | Vcc | Vcc | Vcc | Vcc |
| C4A | - | - | - | - | - | Vcc-ic |
| C4B | - | - | - | - | - | - |
| C5 | CLK | CLK | CLK | CLK | CLK | CLK |
| C6 | Vss | - | - | - | - | - |
| C6A | - | LA | LA | LA | LA | LA |
| C6B | - | LB | LB | LB | LB | LB |
| C7 | DAT0 | DAT0 | DAT0 | DAT | DAT0 | DAT0 |
| C8 | DAT1 | DAT1 | DAT1 | - | - | - |
| C9 | DAT2 | DAT2 | DAT2 | - | - | - |
| C10 | DAT4 | DAT4 | RES-ic | - | DAT2 | DAT2 |
| C11 | DAT5 | DAT5 | CLK-ic | - | NC OR CLK-ic | NC OR CLK-ic |
| C12 | DAT6 | DAT6 | NC OR Vcc-ic | - | NC OR I/O-ic | NC OR I/O-ic |
| C13 | DAT7 | DAT7 | I/O-ic | - | DAT1 | DAT1 |

MEMORY CARD AND SEMICONDUCTOR DEVICE

CROSS-REFERENCE TO RELATED APPLICATION

This application is a continuation of application Ser. No. 10/960,995 filed Oct. 12, 2004 now U.S. Pat. No. 7,325,746.

The present application claims priority from Japanese application JP 2003-374237 filed on Nov. 4, 2003, the content of which is hereby incorporated by reference into this application.

BACKGROUND OF THE INVENTION

The present invention relates to noncontact interface technology in a card device or in a semiconductor device that is typical of a memory card, and antenna connection technology for a noncontact interface, and, for example, relates to an effective technology for applying to the noncontact interface of the memory card that mounts an IC card microcomputer together with a card controller and a nonvolatile memory.

Patent Reference 1 describes technology by which an SIM (subscriber identity module) is mounted in a memory card conforming to MMC (MultiMedia Card: registered mark) Standards and security is enhanced so that multibanks or multifunctions can be implemented maintaining compatibility with the MultiMedia Card Standards.

Patent Reference 2 describes a memory unit that mounts a flash memory chip, an IC card chip that executes security processing, and a controller chip that controls both the chips in accordance with an external instruction.

Moreover, Non-Patent Reference 1 describes the MultiMedia Card Standards.

[Patent Reference 1] International Unexamined Patent Publication No. WO01/84490 Pamphlet

[Patent Reference 2] Japanese Unexamined Patent Publication No. Hei 15 (2003)-91704

[Non-Patent Reference 1] The MultiMedia Card System Specification Version 3.3

SUMMARY OF THE INVENTION

The inventors examined a noncontact interface of a memory card that mounts an IC card microcomputer together with a card controller and a nonvolatile memory, and, in particular, an antenna connecting pin used for the noncontact interface. Hereby, the inventors found the necessity of considering two types of inconvenience. One type of inconvenience is caused by connecting a non-antenna terminal of a card host to an antenna connecting pin of the memory card when the antenna connecting pin is enlarged to the memory card or an existing pin also serves as the antenna connecting pin, and the memory card that corresponds to the noncontact interface is inserted into a card host for an existing memory card. The other type of inconvenience is caused by connecting an antenna terminal of the card host to a pin of the memory card unrelated to the antenna when an existing memory card is inserted into the card host for the noncontact interface.

An object of the present invention is to provide a semiconductor device having an antenna connection function for a noncontact interface by suppressing a modification with regard to the pin arrangement or pin shape of a memory card that does not correspond to the noncontact interface to the minimum.

Another object of the present invention is to provide a memory card without any inconvenience caused by connecting a non-antenna terminal of a card host to an antenna connecting pin of the memory card when the memory card is inserted into a card host for the memory card that does not correspond to a noncontact interface.

A further object of the present invention is to provide a memory card without any inconvenience by connecting an antenna terminal of a card host to any pin of the memory card that are not the antenna pin of the memory card when the memory card that does not correspond to a noncontact interface is inserted into a card host for the noncontact interface.

The above and other objects and new features of the present invention will be apparent from the description and accompanying drawings of this specification.

An outline of a typical invention among the inventions disclosed in this application is described briefly below.

[1] A memory card having a nonvolatile memory, a card controller that reads and stores data from and in the nonvolatile memory, and an IC card microcomputer that performs cryptographic processing allows a pin column to be formed along one side of the memory card. The pin column has two potential supply pins (C4: Vcc and C3: Vss), a data pin, a command pin, a clock pin and two antenna connecting pins (C6A: LA and C6B: LB). The two antenna connecting pins are arranged at intervals as split pins and an area occupied by the two antenna connecting pins is same or under the area of one potential supply pin. The IC card microcomputer inputs or outputs the data via an antenna connected to the antenna connecting pin.

The size of the two antenna connecting pins is at maximum as large as the size of the one potential supply pin. For this reason, the two antenna connecting pins are arranged on the memory card, which corresponds to the noncontact interface, by using a pin area having the size of the one potential supply pin, which is arranged on a memory card that does not correspond to a noncontact interface. Accordingly, the pin area of the memory card that corresponds to the noncontact interface can be formed without departing from the pin area of the memory card that does not correspond to the noncontact interface.

In a desirable form of the present invention, the place where the two antenna connecting pins are formed corresponds to an area (C6: Vss) in which a ground potential supply pin is formed in a memory card that is not provided with a data input/output function via an antenna and does not correspond to a noncontact interface. When the memory card relating to the present invention that corresponds to the noncontact interface is inserted into a card host of the memory card that does not correspond to the noncontact interface, ground potential is connected to one or both of the antenna connecting pins. Because an AC component, that is, a signal component is not included in the potential ground, the operation of the memory card is not affected. Conversely, even if a high frequency component overlaps with the ground potential of a circuit by the antenna connecting pin, the potential will not vary on a large scale. Accordingly, when the memory card is inserted into the card host for the memory card that does not correspond to the noncontact interface, there is no inconvenience caused by connecting a non-antenna to the antenna connecting pin. Moreover, when the memory card that does not correspond to the noncontact interface is inserted into the card host for the noncontact interface, the card host antenna is connected to the ground potential supply pin of the memory card that does not correspond to the noncontact interface and the antenna is short-circuited. Nevertheless, because the antenna electromotive force is low and the antenna output impedance is high, there is no inconvenience by the antenna short circuit.

Let it be considered that an AC component is prohibited accurately from overlapping with circuit ground potential from an antenna connecting pin, and, that a signal component is not precluded from being transmitted. In that case, the antenna connecting pin should desirably connect a filter circuit to which an AC coupling capacitance element (Cac) that separates a high frequency signal is connected.

[2] A memory card having a nonvolatile memory, a card controller that reads and stores data from and in the nonvolatile memory, and an IC card microcomputer that performs cryptographic processing allows a pin column to be formed along one side of the memory card. The pin column has three potential supply pins (C4A: Vcc, C4B: Vcc-ic, and C3: Vss), a data pin, a command pin, and a clock pin. The three potential supply pins include a circuit ground potential supply pin (C3: Vss) that supplies circuit ground potential to the nonvolatile memory, card controller, and IC card microcomputer, a first potential supply pin (C4A: Vcc) that supplies power potential (first potential) to the nonvolatile memory and card controller, and a second potential supply pin (C4B: Vcc-ic) that supplies power potential (third potential) to the IC card microcomputer. The first potential supply pin and the second potential supply pin are arranged at intervals as split pins and an area occupied by the first potential supply pin and the second potential supply pin is same or under the area of one potential supply pin.

The size of the two pins of the first potential supply pin and the second potential supply pin is largest in the size of the ground potential supply pin. For this reason, the two potential supply pins, namely first potential supply pin and second potential supply pin, are arranged on the memory card, which is allowed to corresponds to the individual power-on reset that is meaning the power-on reset for the IC card microcomputer and the power-on reset for the card controller and the nonvolatile memory are performed respectively, by using a pin area having the size of the one ground potential supply pin, which is arranged on a memory card that does not correspond to individual power-on reset. Accordingly, the pin area of the memory card that corresponds to the power-on reset can be formed without departing from the pin area of the memory card that does not corresponds to the individual power-on reset.

In a desirable form of the present invention, the place where the two first potential supply pin and second potential pin are formed corresponds to an area in which a first potential supply pin (C4: Vcc) is formed in a memory card that does not correspond to individual power-on reset. The first potential supply pin formed in a memory card that does not correspond to individual power-on reset is the almost same size as the ground potential supply pin formed in a memory card that corresponds to individual power-on reset. When the memory card relating to the present invention that corresponds to the individual power-on reset is inserted into a card host for the memory card that does not correspond to the individual power-on reset, the first potential supply pin and the second potential supply pin are short-circuited on the side of the card host. Accordingly, although both the pins disable the individual power-on reset, other operations are not affected. Moreover, when the memory card that does not correspond to the individual power-on reset is inserted into the card host that corresponds to the individual power-on reset, a power pin (first power pin) for the first potential supply pin on the side of the card host and a power pin (second power pin) for the second potential supply pin on the side of the card host are short-circuited. When the second power pin is selectively connected conductively to ground potential on the side of the card host in a short-circuited state and reset for power-on, a short circuit occurs between the circuit ground potential and the first potential, thereby causing inconvenience. To suppress this short circuit, on the side of the card host, a power-on reset switch (17) that is selectively connected conductively to the ground potential via a high resistor (16) should be arranged in a power supply route into the second potential supply pin. Otherwise, the first potential is first supplied on the side of the card host. Subsequently, when the first potential is detected in the power supply route into the second potential supply pin, the power supply route into the second power pin can also be cut off.

[3] A memory card that corresponds to a noncontact interface according to another standpoint apart from the above has a card controller, a nonvolatile memory connected to the card controller, and an IC card microcomputer. The memory card has a first potential supply pin and a second potential supply pin as a power pin respectively. The memory card has a command pin for supplying a command that instructs the card controller on an operation, a data pin used for data input/output, a clock pin used for the input of a clock signal, and two antenna connecting pins. The IC card microcomputer inputs and outputs data to and from an antenna connected to the antenna connecting pin.

A memory card that corresponds to a noncontact interface and individual power-on reset according to another standpoint apart from the above has a card controller, a nonvolatile memory connected to the card controller, and an IC card microcomputer. The memory card has a first potential supply pin that supplies first potential and a second potential supply pin that supplies second potential to the card controller and nonvolatile memory. The memory card has a third potential supply pin that supplies third potential to the IC card microcomputer. The memory card has a command pin for receiving a command that instructs the card controller on an operation, a data pin used for data input/output, a clock pin used for the input of a clock signal, and two antenna connecting pins (C6A: LA and C6B: LB). The IC card microcomputer inputs and outputs data to and from an antenna connected to the antenna connecting pin.

As a specific form of the above present invention, the two antenna connecting pins are mutually arranged adjacently. A distance between the two antenna connecting pins is constructed more narrowly than a distance between one of the antenna pins and another pin adjacent to it.

As a specific form of the above present invention, the area of the two antenna connecting pin is constructed smaller than the area of the other pin.

As a specific form of the above present invention, the two antenna connecting pins have a first length in a first direction and a second length in a second direction orthogonal to the first direction. The other pin has a length equal to or longer than the first length in the first direction, and a length longer than the second length in the second direction.

As a specific form of the above present invention, the memory card have a first pin column along a first side of the memory card and a second pin column near by a second side opposed to the first side with regard to the first pin column. The two antenna connecting pins are arranged in the first pin column.

A memory card that corresponds to a noncontact interface and individual power-on reset according to a further standpoint apart from the above has a card controller, a nonvolatile memory connected to the card controller, and an IC card microcomputer. The memory card has a first potential supply pin that supplies first potential and a second potential supply pin that supplies second potential to the card controller and nonvolatile memory. The memory card has a third potential supply pin that supplies third potential to the IC card microcomputer. The memory card has a command pin for inputting a command that instructs the card controller on an operation and outputting a reply to the command, a data pin that inputs and outputs data stored or to be stored in the nonvolatile memory and inputs an address that specifies an access destination for the nonvolatile memory, and two antenna connecting pins (C6A: LA and C6B: LB) for connecting an antenna used for the data input/output of the IC card microcomputer. When the data inputs and outputs to and from the IC card microcomputer via the antenna in a state in which the nonvolatile memory is not accessed, the second potential is supplied from the second potential supply pin and the third potential is supplied from the third potential supply pin.

Data is input and output to and from the IC card microcomputer via the antenna. In that case, if it is detected that one or both of the second potential and the third potential are not supplied from the second potential supply pin and the third potential supply pin, the IC card microcomputer can also be operated by the electric power supplied from the antenna.

[4] Moreover, the present invention according to a further standpoint is a semiconductor device that can be connected to an external device. The external device has a plurality of pins for connecting with the semiconductor device, and the plurality of pins have at least two pins used for a first function. The semiconductor device has a plurality of pins for connecting with the plurality of pins of the external device. The semiconductor device has pins (C6A: LA and C6B: LB) for connecting an antenna used for noncontact communication at a place of the one pin (C6: Vss) among the pins used for the first function of the external device. At least the two pins used for the first function are potential supply pins to which the same potential is supplied, for example.

Moreover, the present invention according to a further standpoint is a semiconductor device that can be connected to an external device. The external device has a plurality of pins for connecting with the semiconductor device, and the plurality of pins include pins used for a first function. The semiconductor device has a plurality of pins for connecting with the plurality of pins the external device has. In a first operating state, a plurality of pins (C8: DAT1, C9: DAT2, ...) used for the first function are used for a first function. In a second operating state, at least the two pins (C8: DAT1 and C9: DAT2) among a plurality of pins used for the first function are used to connect an antenna to be used for noncontact communication. The pins used for the first function are data input/output pins used for inputting and outputting data at each different bit position, for example.

Moreover, the present invention according to a further standpoint is a semiconductor device that can be connected to an external device. The external device has a plurality of pins for connecting with the semiconductor device. The plurality of pins includes pins used for a first function and a pin used for a second function. The semiconductor device has the plurality of pins for connecting with a plurality of pins the external device has. In a first operating state, the pins used for the first function are used for a first function and the pin used for a second function is used as the second function. In a second operating state, at least the pin (C6: Vss) among the pins used for the first function and a pin (C7) used for the second function are used for connecting an antenna to be used for noncontact communication. The pins used for the first function are potential supply pins to which the same potential is supplied, for example, and the pin used for the second function is a data input/output pin.

As a specific form of the above present invention, an AC coupling capacitance element is connected to a pin for connecting an antenna used for the noncontact communication.

Moreover, the first operating state is a data storage operation or a read operation. A memory card has a nonvolatile memory that stores data and a controller for controlling the storage operation and read operation with regard to the nonvolatile memory.

Moreover, the second operating state is an operation including cryptographic processing. A memory card has a first controller for controlling an operation in a first operating state and a second controller for performing cryptographic processing in a second operating state.

Moreover, the first operating state is a data storage operation or a read operation, and the second operating state is an operation including data cryptographic processing. A memory card has a controller for controlling an operation in a first operating state, performing cryptographic processing in a second operating state, and a nonvolatile memory that stores data.

[5] Moreover, the present invention according to a further standpoint is a processing unit to which a semiconductor device having both a contact communication function and a noncontact communication function. The processing unit has a plurality of pins connected to a pin that is used for the contact communication function of the semiconductor device and a switching function that switches at least two pins among the plurality of pins to an antenna that inputs and outputs data using the noncontact communication function of the semiconductor device.

Moreover, the present invention according to a further standpoint is a processing unit to which a semiconductor device having both a contact communication function and a noncontact communication function. The processing unit has a plurality of pins connected to a pin that is used for the contact communication function of the semiconductor device. In a first operating state, the plurality of pins are used for data input/output and power supply using the contact communication function of the semiconductor device. In a second operating state, the two pins among the plurality of pins switch connection into an antenna that inputs and outputs the data using the noncontact communication function of the semiconductor device.

Advantages obtained from a typical invention among the inventions disclosed in this application are described briefly below.

A semiconductor device having an antenna connection function for a noncontact interface can be implemented by suppressing a modification with regard to the pin arrangement or pin shape of a memory card that does not correspond to the noncontact interface to the minimum.

A memory card without any inconvenience caused by connecting a non-antenna to an antenna connecting pin can be implemented when the memory card is inserted into a card host for the memory card that does not correspond to a noncontact interface.

A memory card without any inconvenience caused by connecting an antenna to a pin that is independent of the antenna can be implemented when the memory card that does not correspond to a noncontact interface is inserted into a card host for the noncontact interface.

BRIEF DESCRIPTION OF THE DRAWINGS

FIG. 2 is an explanatory drawing illustrating (by example) a pin function of a pin column in accordance with an operation mode and card interface specification of the memory card;

DETAILED DESCRIPTION OF THE PREFERRED EMBODIMENTS

Figure 1:
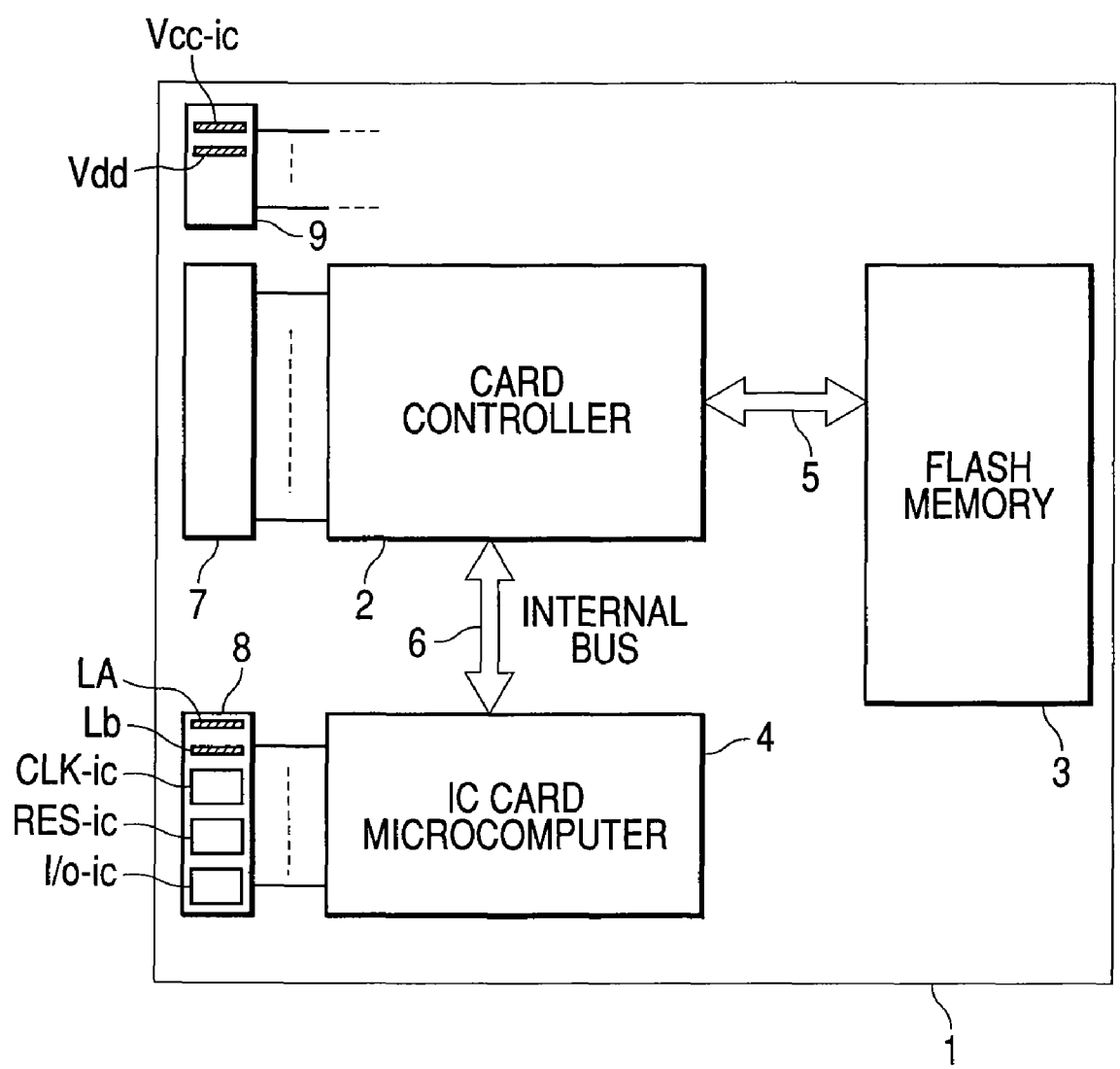
FIG. 1 is a block diagram of a memory card conforming to MultiMedia Card Standards that is an example of a semiconductor device according to the present invention.

FIG. 1 shows a block diagram of a memory card conforming to the MultiMedia Card Standards that is an example of a semiconductor device according to the present invention. A memory card 1 shown in the same block diagram provides multifunctions, such as an information storage function and a security function accompanying cryptographic/decoding processing and authentication processing. The security function is utilized for settlement of accounts using a credit card or charging in transport facilities, for example.

The memory card 1 mounts a card controller 2, an electrically rewritable nonvolatile memory unit such as a flash memory 3 connected to the card controller 2 through an internal bus 5, and an IC (integrated circuit) card microcomputer (also referred to as an IC card microcomputer) 4 in a wiring substrate on which a plurality of external pins are formed. Although limited in particular, the card controller 2, the flash memory 3, and the IC card microcomputer 4 have an individual semiconductor integrated circuit chip respectively. In FIG. 1, the plurality of external pins are divided roughly into an external pin group 7 connected to the card controller 2, an external pin group 8 connected to the IC card microcomputer 4, and an external pin group 9 for power supply. When the IC card microcomputer 4 enables individual power-on reset making the supply of the power potential supply to the IC card microcomputer 4 independent of another device, for example, a power pin Vcc-ic into the IC card microcomputer 4 and a power pin Vcc into another circuit block can be made discrete.

The card controller 2 has an external interface function as a memory card conforming to the MultiMedia Card Standards, a memory interface function that accesses a flash memory as a file memory in accordance with its specification, and an IC card microcomputer interface function that interfaces with an IC card microcomputer using a memory card command.

The flash memory 3 has an electrically erasable and rewritable nonvolatile memory cell transistor (also referred to as a flash memory cell). The flash memory cell has what is called, a stacked gate structure having a floating gate, or, what is called, a split gate structure including a memory transistor unit having an ONO (oxide nitride oxide) gate insulating film and a selected transistor unit. The flash memory cell allows a threshold voltage to rise when electrons are injected into the floating gate, and the threshold voltage to drop when the electrons are removed from the floating gate. The flash memory cell stores information in accordance with the threshold voltage with regard to a word line voltage for data read. The flash memory 3 enables the information stored in a flash memory cell to be read, the information to be stored in (for example, written to) the flash memory cell, and the information stored in the flash memory cell to be initialized (for example, erased) by the control of the card controller 2.

Figure 19:
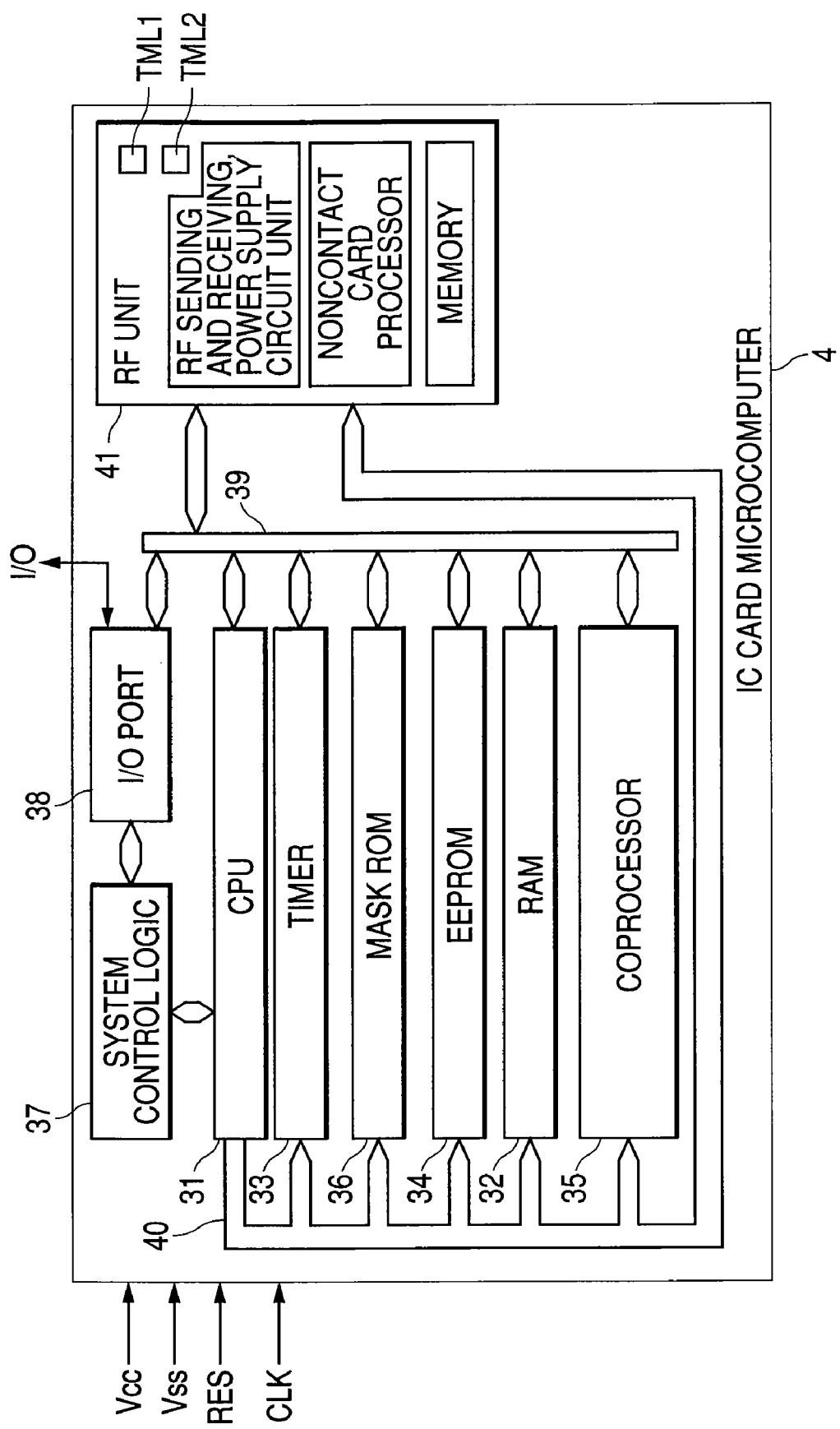
FIG. 19 is a block diagram illustrating (by example) the details of the IC card microcomputer.

The IC card microcomputer 4, which is illustrated in FIG. 19 for example, has a CPU 31 and a nonvolatile memory 34 that holds control information utilized for the operation program and authentication of the CPU, and performs authentication processing or cryptographic/decoding processing in accordance with the CPU operation program. The IC card microcomputer 4 can adopt a device that performs contact interfacing or noncontact interfacing with an external device by itself, and dual interfacing in which both types of interfacing are enabled. The contact interfacing is performed by serial communication using a 1-bit data input/output pin I/O-ic, a clock pin CLK-ic, and a reset pin RES-ic, for example. The noncontact interfacing is performed by high-frequency communication using an antenna connected to pins TML1 and TML2. The IC card microcomputer 4 operates by the noncontact interfacing when electric power is supplied from the antenna connected to the antenna pins (LA and LB). Otherwise, operating power can also be supplied from a card controller or Vcc-ic.

FIG. 2 illustrates (by example) pin functions of the pins in accordance with the operation mode and card interface specification of a memory card. In FIG. 2, 17 types of pin functions of C1 to C13 are defined in all. In the drawing, RSV means a reserved pin in MMC mode, and means a chip select pin in SPI mode. CMD means a command input and reply-to-command output pin. Vss means a ground pin to which circuit ground potential is supplied. Vcc means a power pin to which power potential is supplied. CLK means a memory card clock pin. DAT0 to DAT7 mean data input/output pins. RES-ic means an IC card microcomputer reset pin. CLK-ic means an IC card microcomputer clock pin. Vcc-ic means an IC card microcomputer power pin. LA and LB mean antenna connecting pins. NC means a non-connecting pin.

<<Memory Card Pin Arrangement>>

Figure 3:
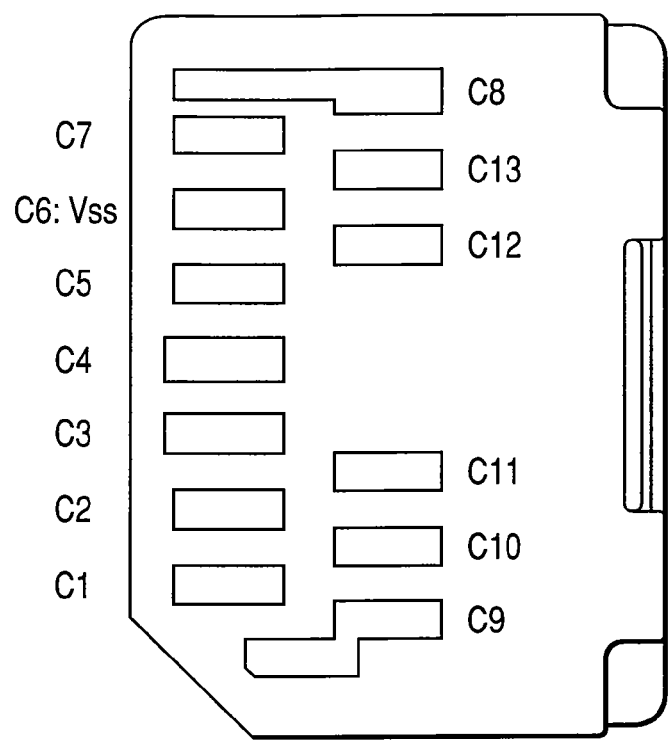
FIG. 3 is a plan view illustrating (by example) a layout of an actual external pin that corresponds to Definition A in the case of 13 pins of FIG. 2.

Definition A in the case of 13 pins of FIG. 2 is a pin function in a memory card that enables the 8-bit parallel data input/output conforming to the MultiMedia Card Standards. FIG. 3 illustrates (by example) a layout of an external pins for this definition. The package of the same drawing has a reduced size that is almost a half of a full size. This pin arrangement does not correspond to a noncontact interface with regard to the IC card microcomputer 4, and contact interfacing is also performed through the card controller 2 via the internal bus 6.

<<Antenna Connecting Split Pin>>

Figure 4:
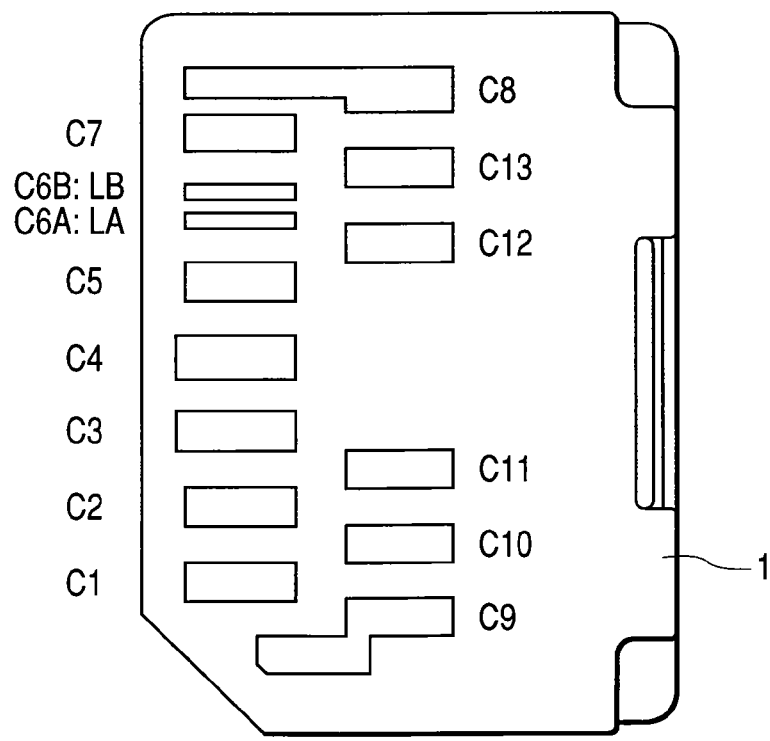
FIG. 4 is a plan view illustrating (by example) the layout of the actual external pin of the memory card that mounts an IC card microcomputer and enables 8-bit parallel data input/output and noncontact interfacing in Definition B of FIG. 2.

Definition B of FIG. 2 is a pin function in a memory card that mounts an IC card microcomputer and enables the 8-bit parallel data input/output and noncontact interfacing conforming to the MultiMedia Card Standards. FIG. 4 illustrates (by example) a layout of an external pins for this definition. The package size of the same drawing is a reduced size in the same manner.

Definition B of FIG. 2 differs from Definition A of FIG. 2 (FIG. 3) in that the two antenna connecting pins LA and LB of C6A and C6B are adopted instead of the ground pin Vss of C6. For the pin function of the memory card in Definition A of FIG. 2, the two pins of C3 and C6 are originally assigned to the ground pin Vss allowing a margin in the Standard. Accordingly, even if C6 is disused, a ground potential supply function will not be hindered. C6A and C6B are included in the pin group 8. C3 and C4 are included in the pin group 9 and other pins are included in the pin group 7.

The two antenna connecting pins LA and LB of C6A and C6B of FIG. 4 are formed corresponding to the position of the one ground pin C6 of FIG. 3 that was disused for FIG. 4. That is, as shown in FIG. 4, the two antenna connecting pins LA and LB of C6A and C6B are divided into two areas in which the size of the one ground pin Vss of C6 is largest and used as a split pin arranged at intervals.

Figure 5:
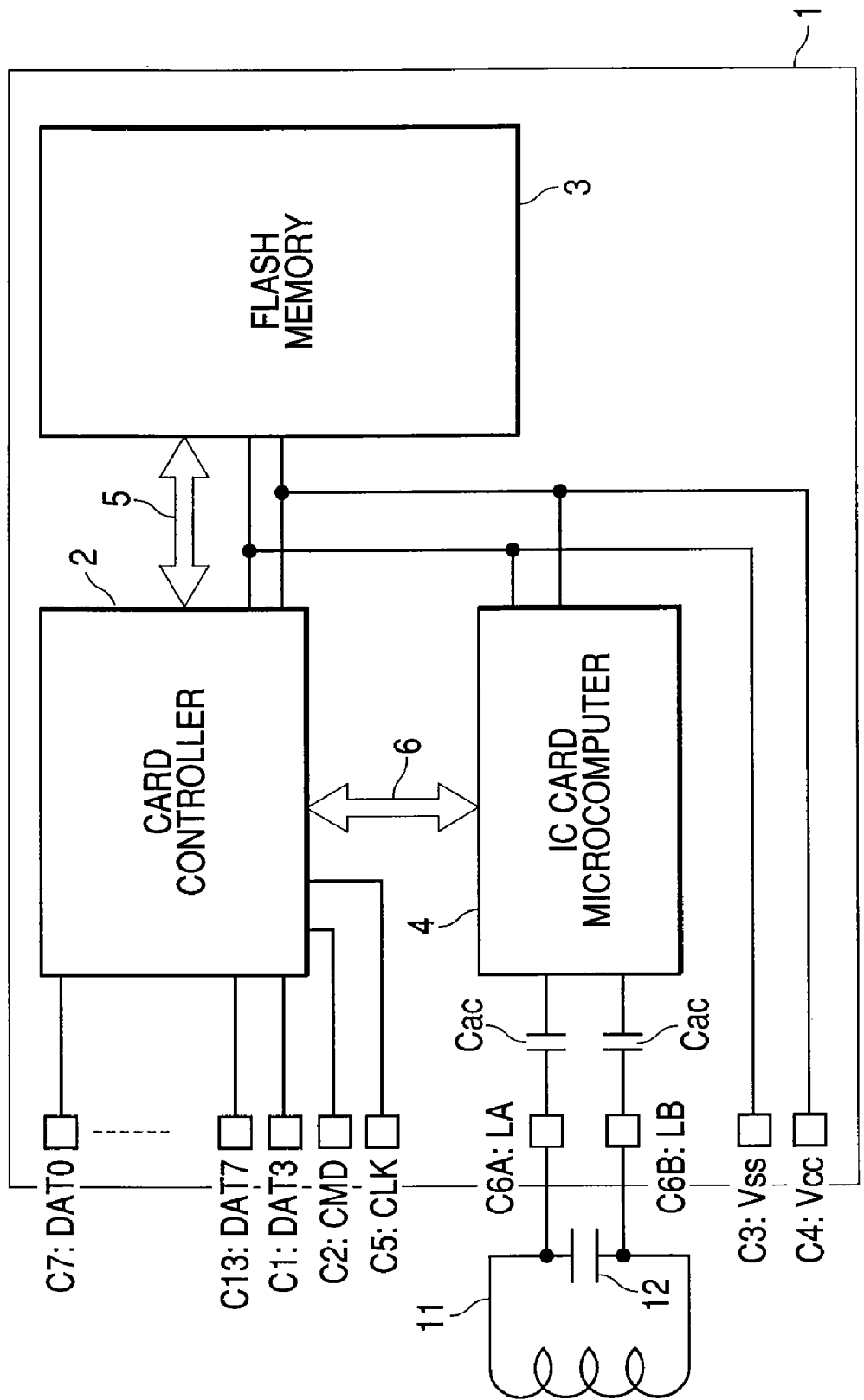
FIG. 5 is a block diagram showing an external interface function of the memory card according to Definition B of FIG. 2.

FIG. 5 shows a block diagram of an external interface function of a memory card according to Definition B of FIG. 2. The IC card microcomputer 4 can input and output data through an external antenna 11 and a resonance (tuning) capacitor 12 connected to the antenna connecting pins LA and LB by noncontact interfacing. The card controller 2 enables 8-bit parallel data input/output via the data pins D0 to D7. Further, in the memory card having the external interface function defined in Definition B of FIG. 2, a sleep instruction must be executed to reset the IC card microcomputer 4 singly. The IC card microcomputer 4 cannot be reset for power-on singly.

The size of an antenna connecting split pin, that is, the size of the two antenna connecting pins LA and LB of C6A and C6B is largest in the size of the one C6 ground pin Vss. For this reason, the memory card 1 that corresponds to a noncontact interface having the other ground pin C3, LA and LB as shown in the pin arrangement of FIG. 4 can be used by devoting a pin area of the size of the one ground pin Vss of C6 to the memory card of the pin arrangement of FIG. 3 that does not correspond to the noncontact interface. Accordingly, an antenna connection area required for the memory card that corresponds to the noncontact interface can be formed. And the other pin areas can be formed same with the pin areas of the memory card of FIG. 3 that does not correspond to the noncontact interface.

The place where the two antenna connecting pins LA and LB are formed corresponds to the area of C6 in which a ground potential supply pin Vss in a memory card that does not correspond to a noncontact interface for data input/output function by an antenna. The memory card that corresponds to the noncontact interface having the pin arrangement of FIG. 4 is inserted into a card host for the memory card that does not correspond to the noncontact interface as shown in the external pin arrangement of FIG. 3. In that case, the antenna connecting pins LA and LB are connected to a ground potential supply pin inside the card host. Because an AC component is not provided in ground potential, that is, a signal component is not provided, the operation of the memory card is not affected. Conversely, even if a frequency component overlaps with the ground potential by the antenna connecting pins LA and LB, the potential will not vary greatly. Accordingly, the memory card 1 having the pin arrangement of FIG. 4 is inserted into the card host for the memory card that does not correspond to the noncontact interface as shown in the external pin arrangement of FIG. 3. In that case, there is no inconvenience caused by connecting another pin on the side of the card host to the antenna connecting pins LA and LB. Moreover, the memory card that does not correspond to the noncontact interface is inserted into the card host for the noncontact interface. In that case, an antenna connecting pin of the card host is connected to the ground pin of C6 of the memory card that does not correspond to the noncontact interface and an antenna is short-circuited. Nevertheless, because the antenna electromotive force is low and the antenna output impedance is also high, there is inconvenience by the antenna short circuit.

Let it be considered that a DC component is prohibited accurately from overlapping with the ground potential of a conventional card host from antenna connecting pins LA and LB, and, that a signal component is not precluded from being transmitted. In that case, desirably, as illustrated (by example)

in FIG. 5, the antenna connecting pins LA and LB should be connected to the IC card microcomputer 4 via an AC coupling capacitance element Cac.

Figure 6:
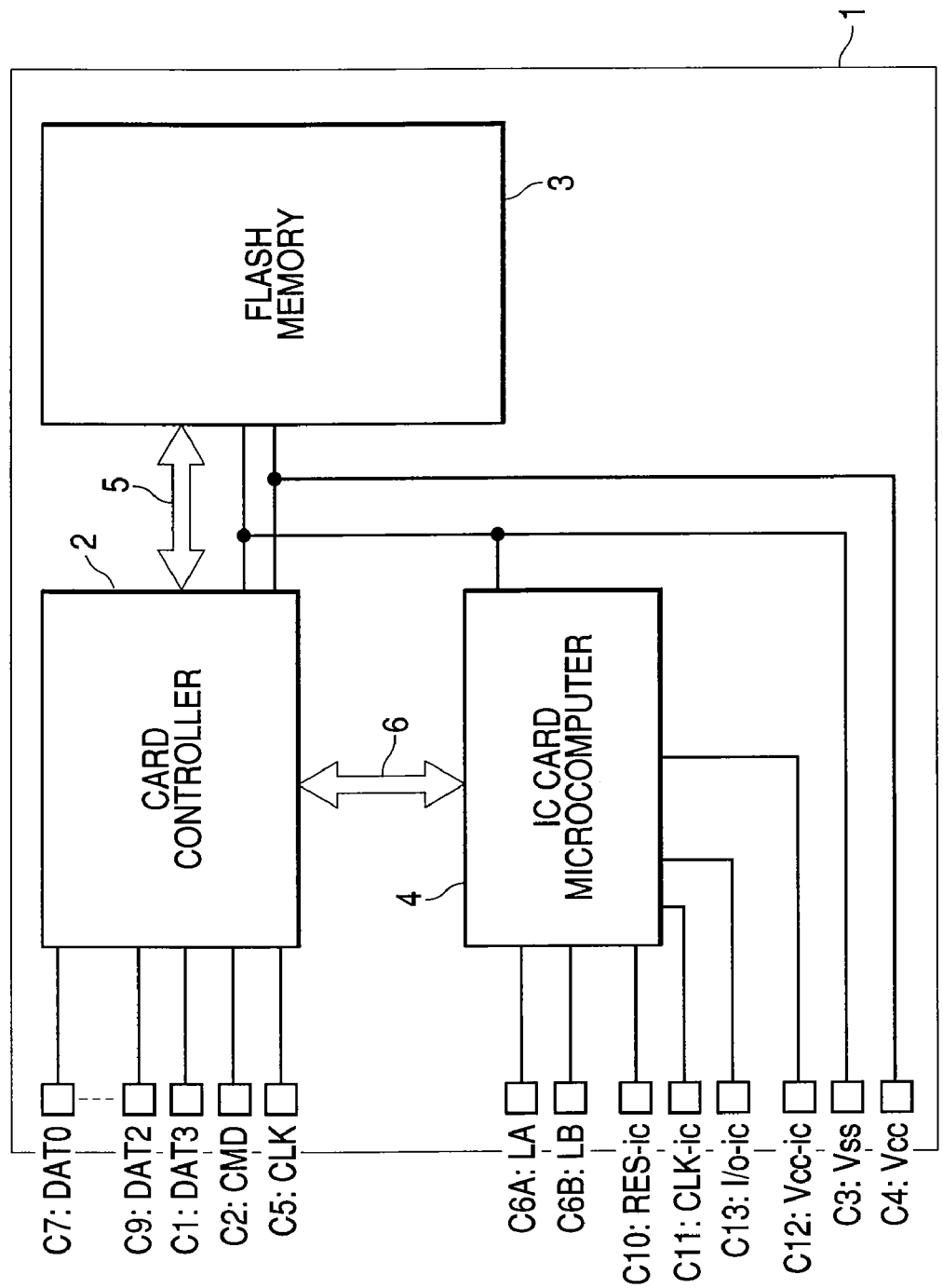
FIG. 6 is a block diagram showing the external interface function of the memory card according to Definition C of FIG. 2.

Definition C of FIG. 2 is a pin function in a memory card that mounts an IC card microcomputer and enables all 4-bit parallel data input/output and noncontact interfacing and contact interfacing conforming to the MultiMedia Card Standards. A layout of an external pins for this definition is the same as FIG. 4. Definition C of FIG. 2 differs from Definition B of FIG. 2 in that 4-bit data pins DAT0 to DAT4 of C7 to C9 and C1 are used as external data interface pins through a card controller C6, and a reset pin RES-ic of C10, a clock input pin CLK-ic of C11, an IC card dedicated power pin Vcc-ic of C12, and a data serial input/output pin I/O-ic are adopted as the contact interface pins by the IC card microcomputer 4. FIG. 6 shows a block diagram of an external interface function of a memory card according to Definition C of FIG. 2. Because the dedicated power pin Vcc-ic is assigned to the IC card microcomputer 4, the IC card microcomputer 4 can singly be reset for power-on. An operational advantage by the antenna connection split pins LA and LB of C6A and C6B is the same as FIG. 5.

Figure 7:
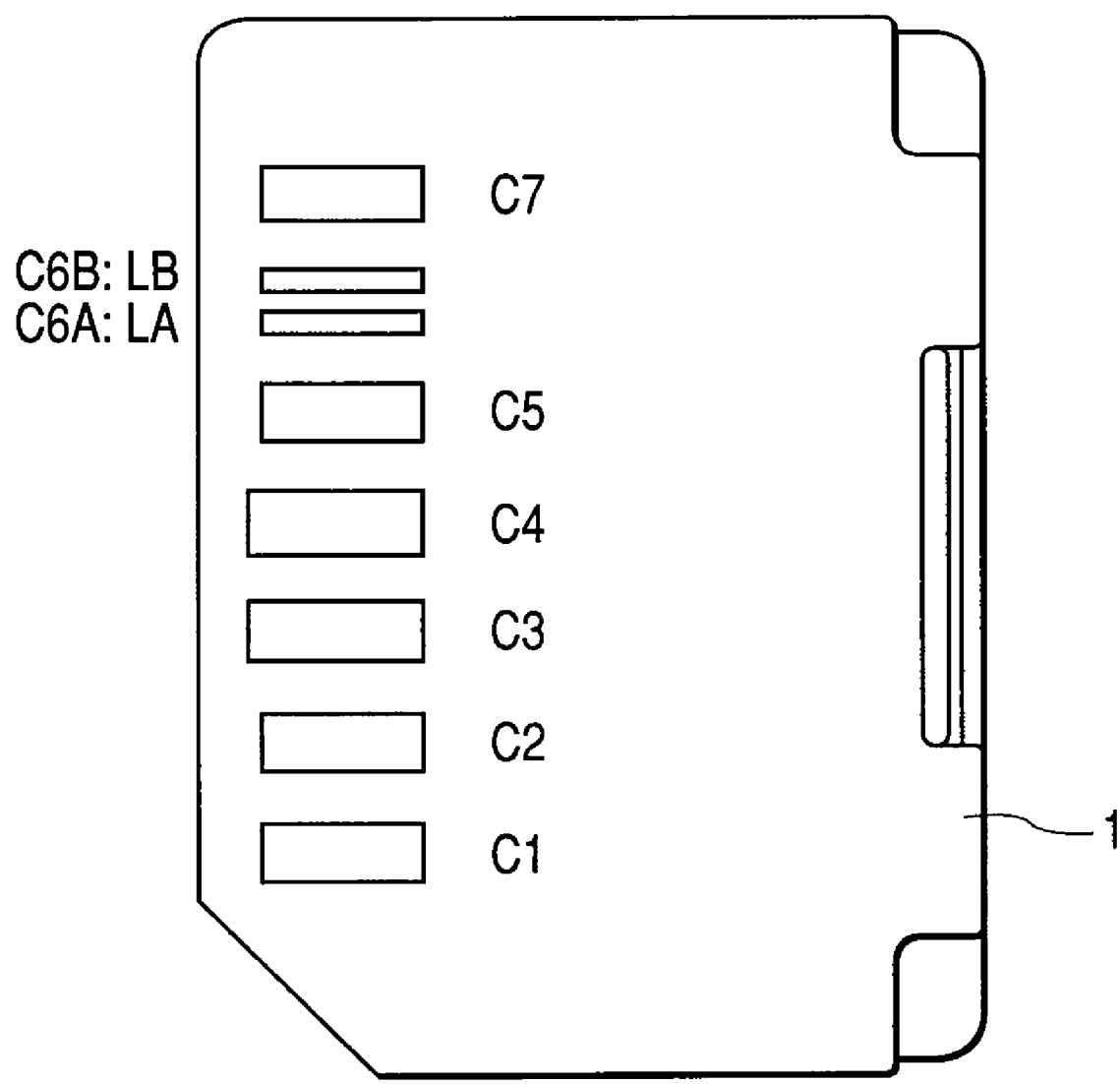
FIG. 7 is a plan view showing the layout of the actual external pin of the memory card that mounts the IC card microcomputer and enables both 1-bit data input/output and noncontact interfacing conforming to the MultiMedia Card Standards in Definition D of FIG. 2.
Figure 8:
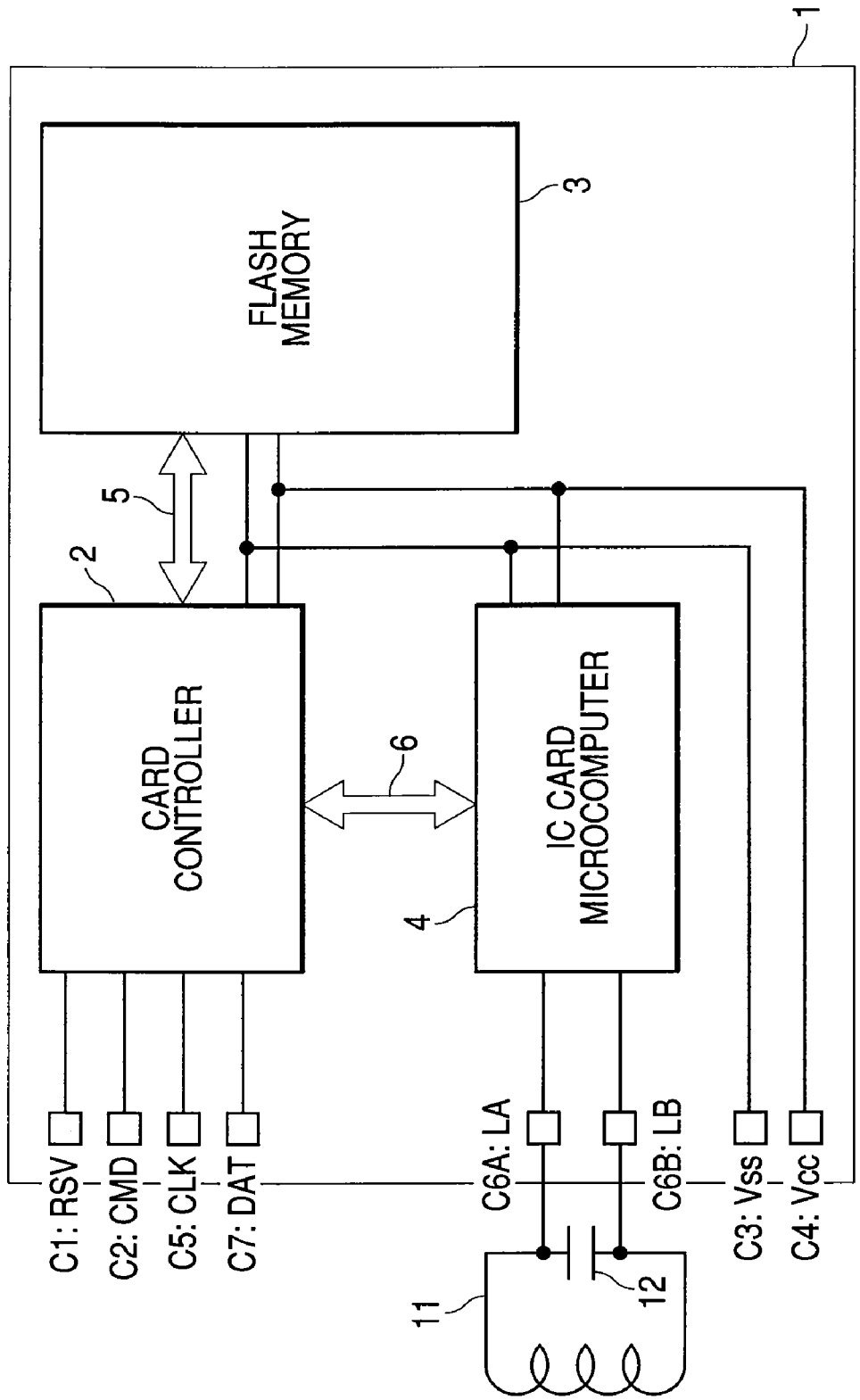
FIG. 8 is a block diagram showing the external interface function of the memory card according to Definition D of FIG. 2.

Definition D of FIG. 2 is a pin function in a memory card that mounts an IC card microcomputer and enables both the 1-bit parallel data input/output and noncontact interfacing conforming to the MultiMedia Card Standards. A layout of an external pins for this definition is shown in FIG. 7. The package size of this drawing is a reduced size in the same manner. The definition of D of FIG. 2 differs from Definition B of FIG. 2 in that an external data interface pin through the card controller 6 uses a 1-bit data pin DAT of C7. FIG. 8 shows a block diagram of the external interface function of the memory card according to Definition D of FIG. 2. The IC card microcomputer 4 cannot singly be reset for power-on. An operational advantage by the antenna connection split pins LA and LB of C6A and C6B is the same as FIG. 5.

Figure 9:
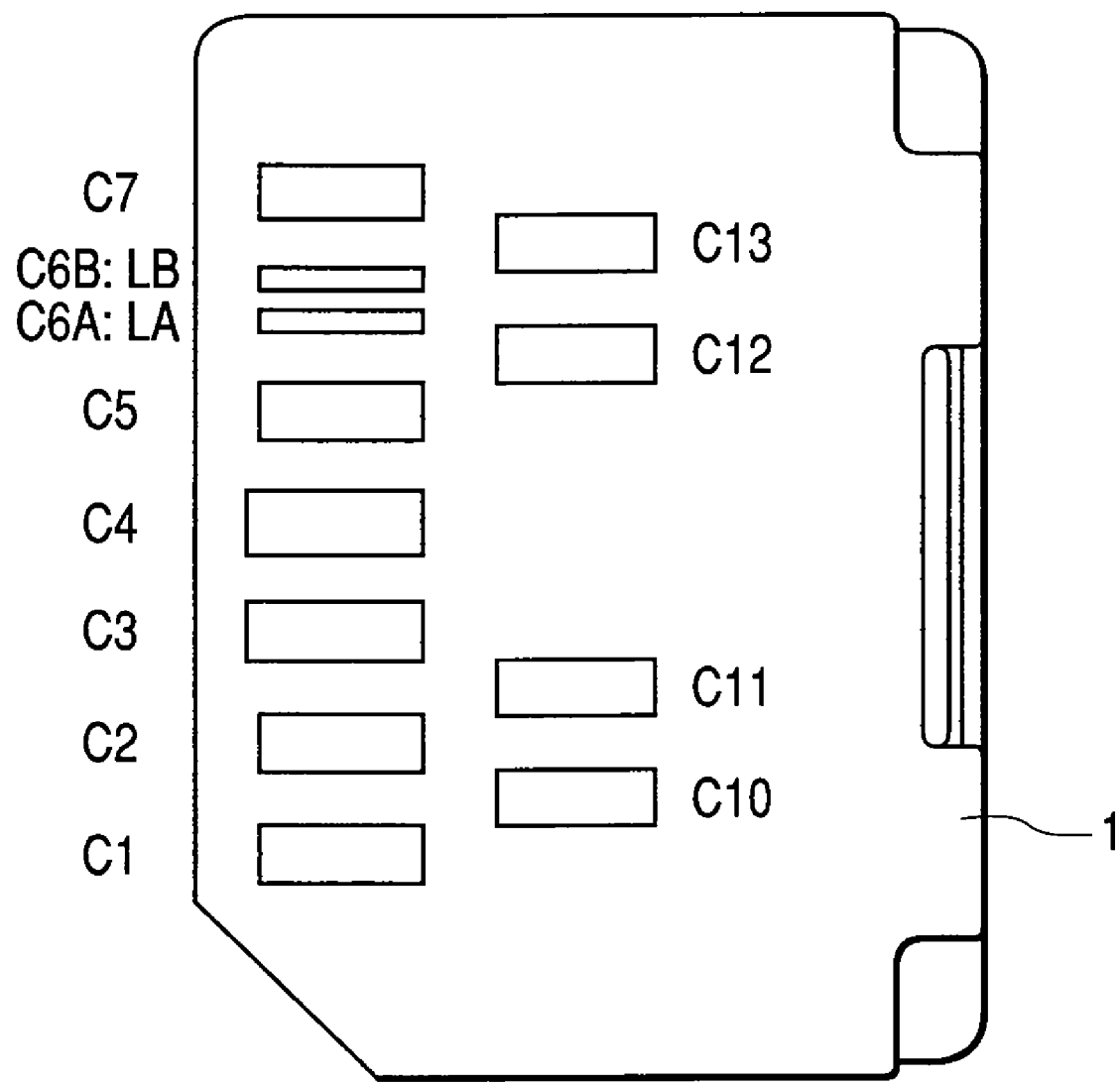
FIG. 9 is a plan view showing the layout of the actual external pin of the memory card that mounts the IC card microcomputer and enables all 4-bit data input/output and noncontact interfacing and contact interfacing conforming to the MultiMedia Card Standards in Definition E of FIG. 2.
Figure 10:
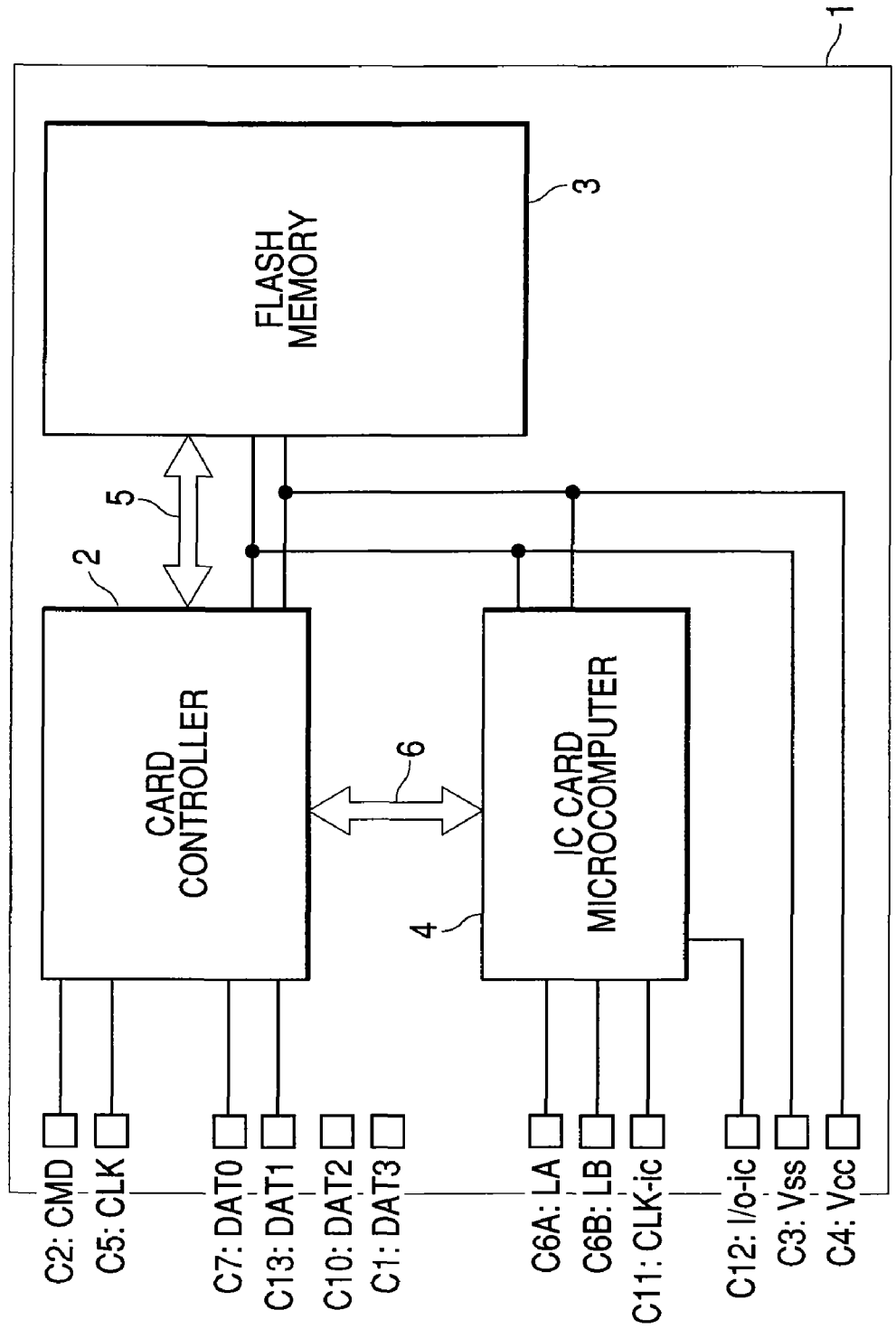
FIG. 10 is a block diagram showing the external interface function of the memory card according to Definition E of FIG. 2.

Definition E of FIG. 2 is a pin function in a memory card that mounts an IC card microcomputer and enables all the 4-bit parallel data input/output and noncontact interfacing and contact interfacing conforming to the MultiMedia Card Standards. The layout of the external pin for this definition is shown in FIG. 9. Definition E of FIG. 2 differs from Definition D of FIG. 2 in that 4-bit data pins DAT0 to DAT4 of C7, C10, C13, and C1 are used as the external data interface pins through the card controller, and a clock input pin CLK-ic of C11 and a data serial input/output pin I/O-ic of C12 as the contact interface pins of the IC card microcomputer 4 are adopted. The IC card microcomputer 4 must be reset by executing a reset instruction based on a command from the card controller 2. FIG. 10 shows a block diagram of the external interface function of the memory card according to Definition E of FIG. 2. An operational advantage by the antenna connection split pins LA and LB of C6A and C6B is the same as FIG. 5.

<<Power Split Pin>>

Figure 11:
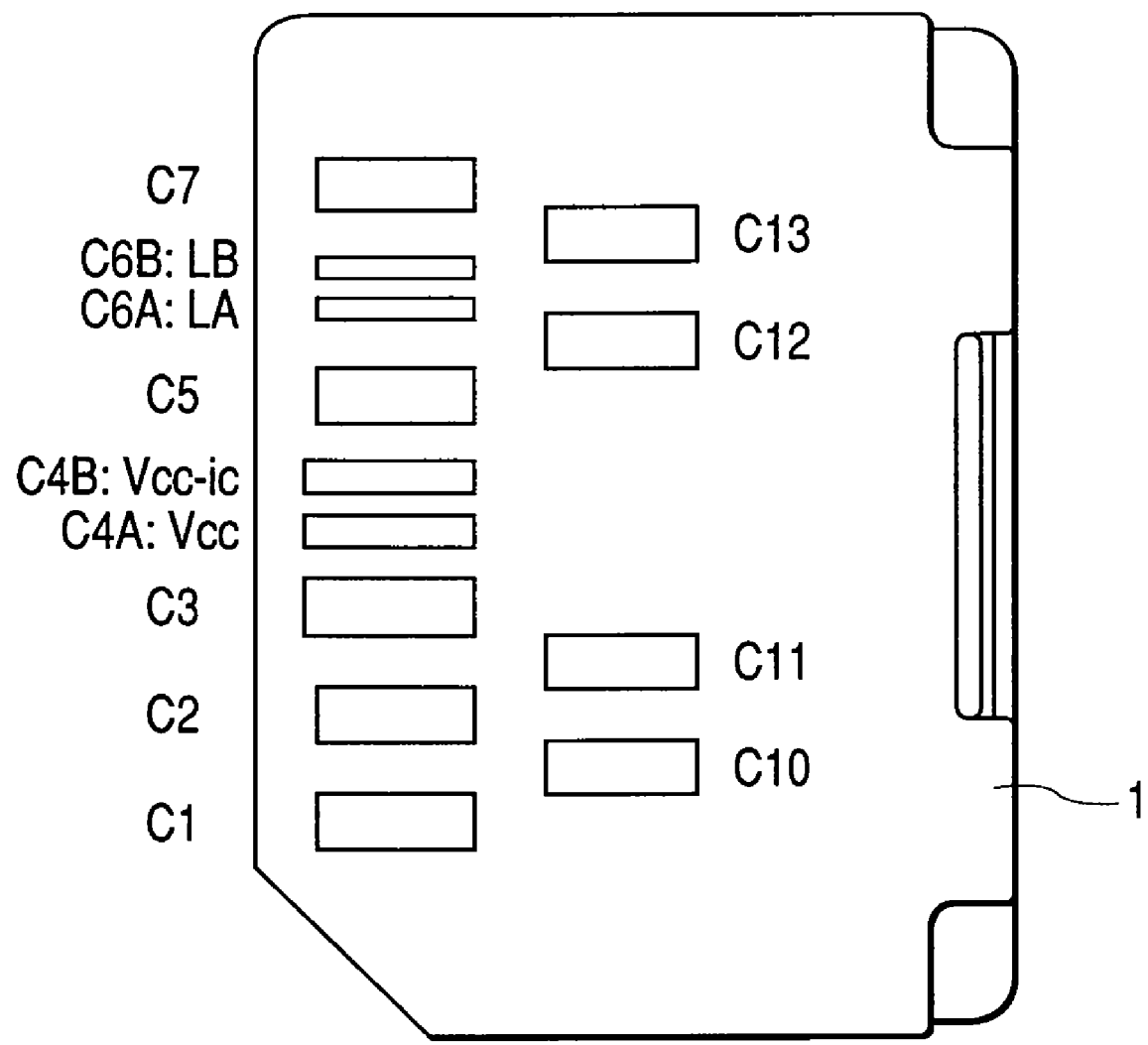
FIG. 11 is a plan view showing the layout of the actual external pin of the memory card having a pin function that adopts a split pin in power pins Vcc and Vcc-ic in addition to an antenna connecting pin in Definition F of FIG. 2.
Figure 12:
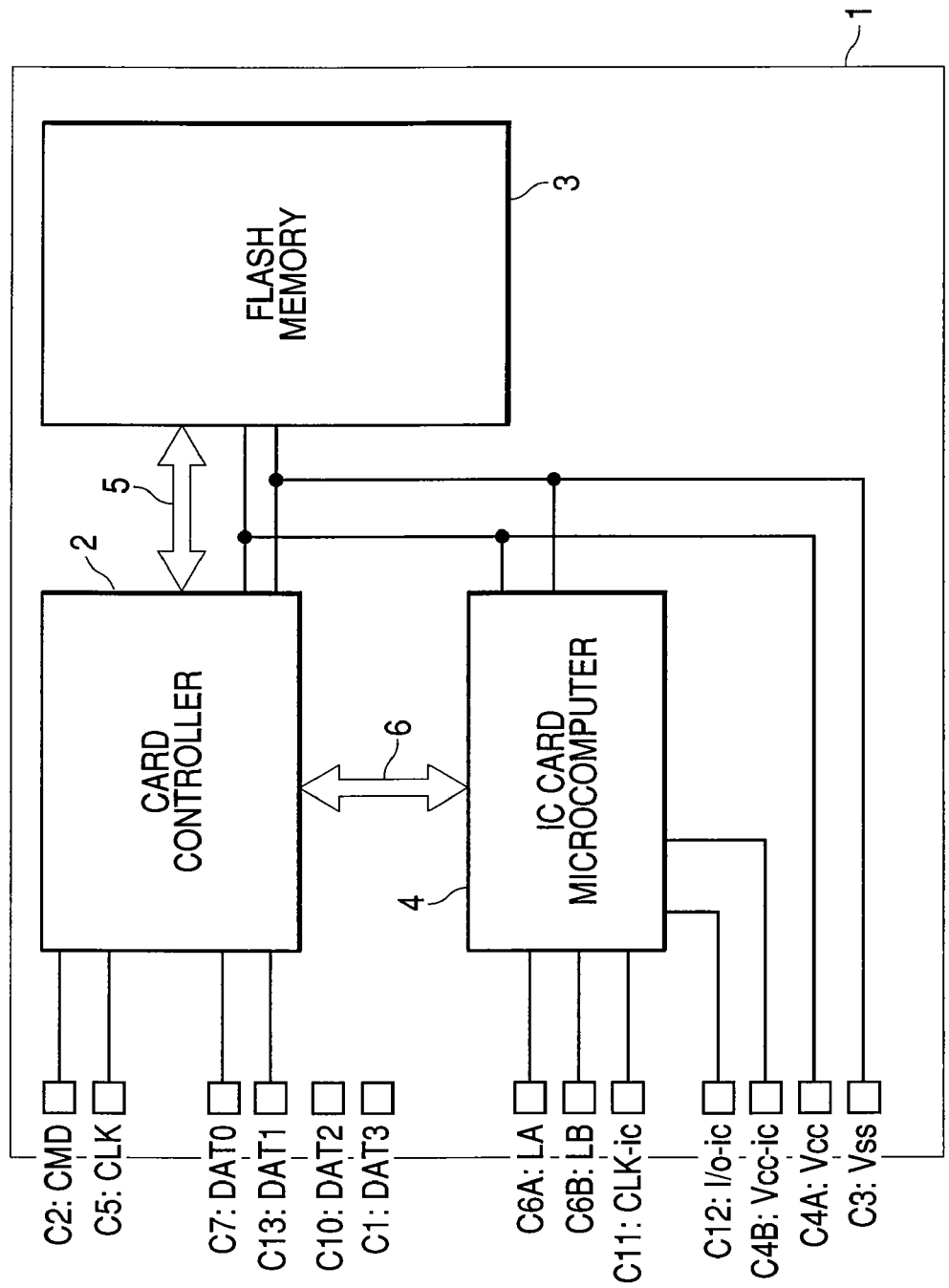
FIG. 12 is a block diagram showing the external interface function of the memory card according to Definition F of FIG. 2.

Definition F of FIG. 2 shows a pin function in a memory card that mounts an IC card microcomputer and enables all the 4-bit parallel input/output and noncontact interfacing and contact interfacing conforming to the MultiMedia Card Standards. In the pin function, both power pins Vcc and Vcc-ic adopt a split pin in addition to the antenna connecting pins LA and LB. FIG. 11 illustrates (by example) a layout of an external pin. The package size of this drawing is a reduced size. FIG. 12 shows a block diagram of the external interface function of the memory card according to Definition F of FIG. 2.

Definition F of FIG. 2 differs from Definition E of FIG. 2 in that the two power pins Vcc and Vcc-ic of C4A and C4B are adopted instead of the power pin of C4. The relationship between the power split pins C4A and C4B and the power pin Vcc of C4 corresponds to the relationship between the antenna connecting split pins LA and LB and the ground pin Vss. That is, the two power pins Vcc and Vcc-ic of C4A and C4B of FIG. 11 are formed corresponding to the position of the one power pin Vcc of C4 of FIG. 9. In a word, as shown in FIG. 11, the two power pins Vcc and Vcc-ic of C4A and C4B are divided in two areas in which the size of the one power pin Vcc is largest and used as a split pin arranged at intervals.

The size of the two pins of the power pin Vcc of C4A and the power pin Vcc-ic of C4B is the largest in the one power pin Vcc of C4. For this reason, the two power pins Vcc and Vcc-ic of C4A and C4B are provided by devoting a pin area of the size of the one power pin Vcc of C4 to a memory card that does not correspond to individual power-on reset with regard to an IC card microcomputer. Accordingly, the memory card that corresponds to the individual power-on reset with regard to the IC power microcomputer can be implemented. Consequently, the pin area of the memory card that corresponds to the individual power-on reset with regard to the IC card microcomputer can be formed. And the other pin areas can be formed same as the pin area of the memory card of FIG. 9 that does not correspond to the individual power-on reset with regard to the IC card microcomputer.

Figure 13:
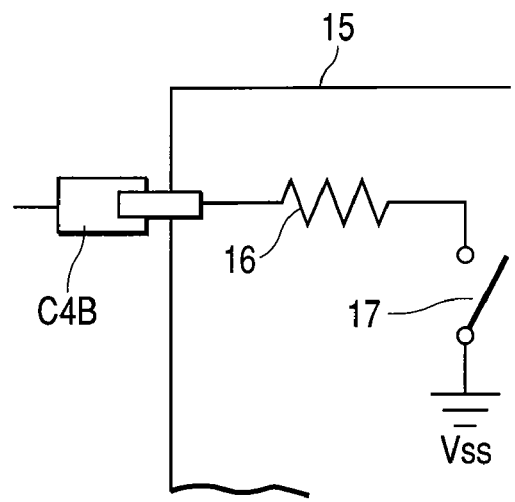
FIG. 13 is a circuit drawing illustrating (by example) basic composition for relaxing or suppressing a short circuit between circuit ground potential and power when the IC card microcomputer is reset for power-on in a power split pin.
Figure 14:
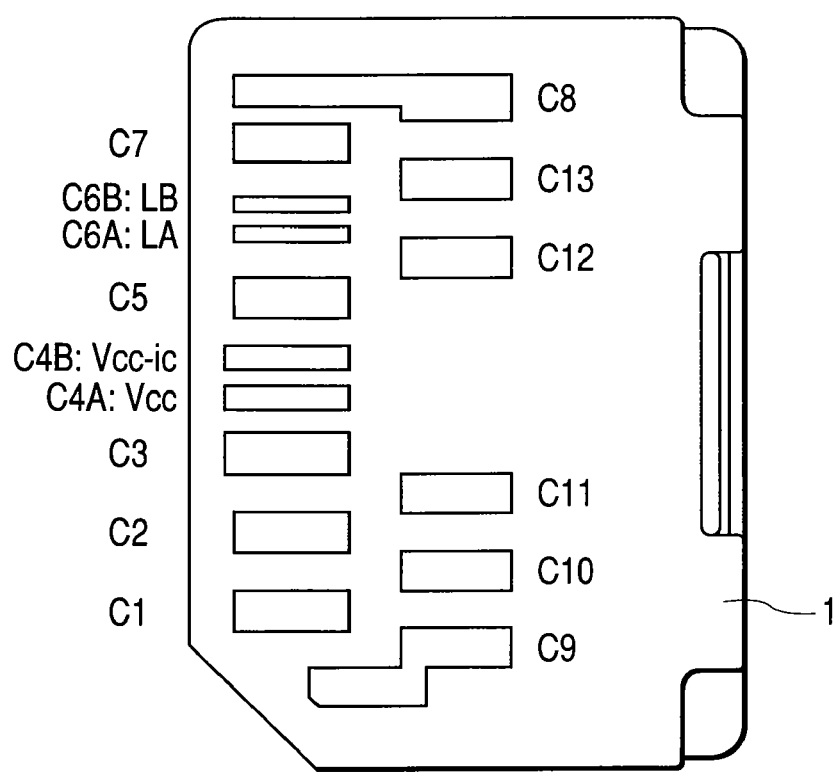
FIG. 14 is a plan view illustrating (by example) a pin arrangement when the power pin of C4 uses the power split pins Vcc and Vcc-ic in Interface Definition B of FIG. 2.
Figure 15:
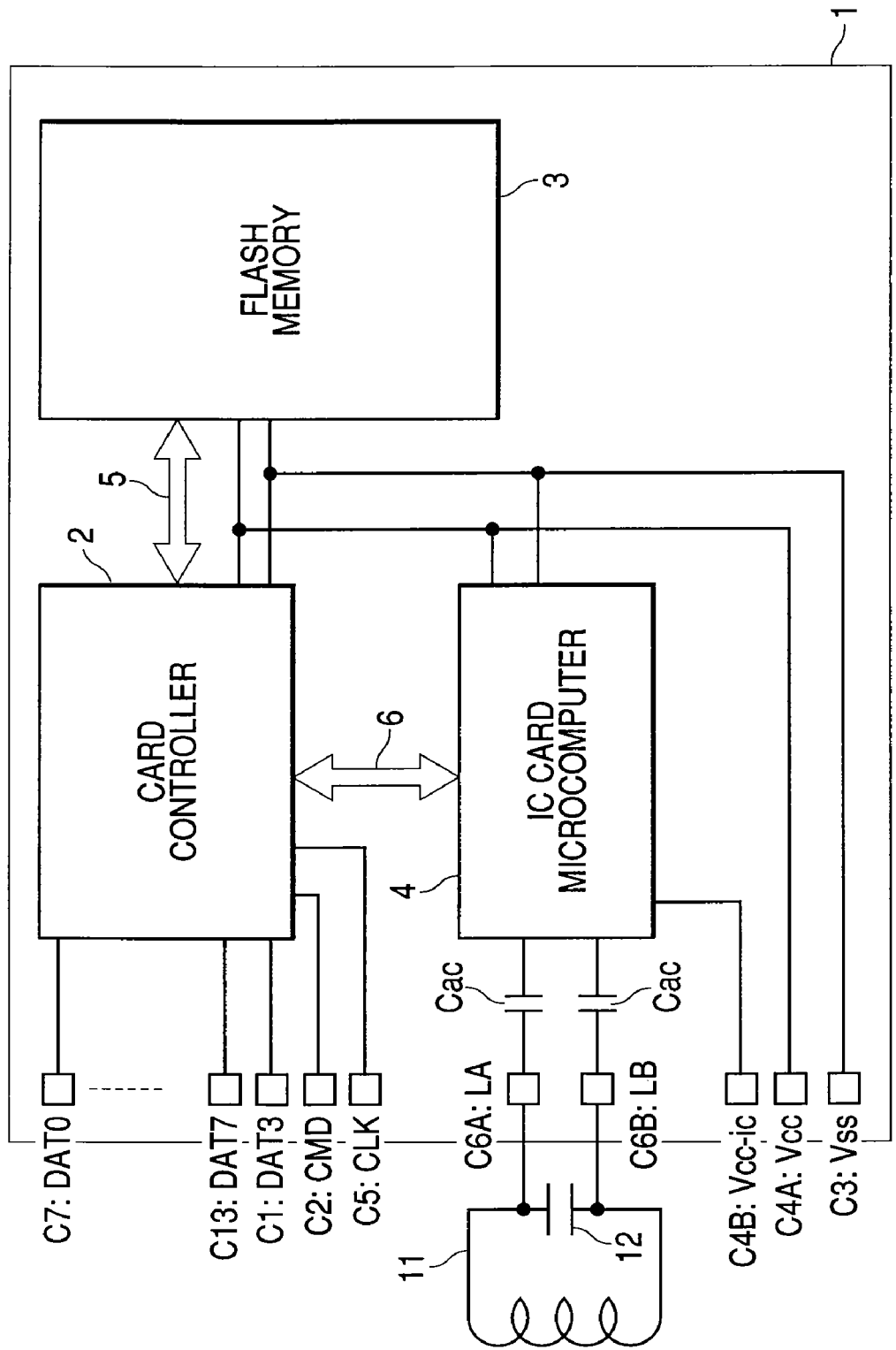
FIG. 15 is a block diagram showing the external interface function of the memory card that corresponds to the pin arrangement of FIG. 14.

The place where the two power pins Vcc and Vcc-ic of C4A and C4B are formed corresponds to an area of C4 in which the power pin Vcc is formed in a memory card that does not correspond to individual power-on reset with regard to an IC card microcomputer. The memory card according to Definition F of FIG. 2 that corresponds to the individual power-on reset is inserted into a card host for the memory card that does not correspond to the individual power-on reset. In that case, the Vcc of C4A and Vcc-ic of C4B are short-circuited on the side of the card host. Accordingly, although the individual power-on reset cannot be enabled, other operations are not affected. In the case where a potential level of the supply power Vcc into the memory card differs from the potential level of the supply power Vcc-ic into the IC card microcomputer, a voltage level shift circuit is comprised in the IC card microcomputer. Accordingly, even when the memory card that corresponds to the individual power-on reset is inserted into the card host for the memory card that does not correspond to the individual power-on reset, the IC card microcomputer can operate normally. When the memory card that does not correspond to the individual power-on reset is inserted into the card host that corresponds to the individual power-on reset, the power for the power pin Vcc of C4A and the power for the power pin Vcc-ic are short-circuited on the side of the card host. When the power pin of C4B is induced into ground potential Vss on the side of the card host and reset for power-on in a short-circuited state on the pin of the memory card, a short circuit occurs between circuit ground potential, thereby causing inconvenience. To suppress this short circuit, as illustrated (by example) in FIG. 13, on the side of the card host 15, a power-on reset switch 17 should be arranged in a power supply route into the power pin Vcc-ic for the IC card microcomputer. The switch is selectively connected conductively to the ground potential Vss via a high resistor 16. Alternatively, Vcc is first supplied to the C4A pin on the side of the card host. Subsequently, when Vcc is detected in the power supply route into the power pin Vcc-ic for the IC card microcomputer, the power supply route into a second power pin can also be cut off. FIG. 14 illustrates (by example) a pin arrangement when the power pin Vcc of C4 changes into the power split pins Vcc and Vcc-ic of C4A and C4B in Interface Definition F of FIG. 2. FIG. 15 shows a block diagram of the external interface function of the memory card that corresponds to the pin arrangement of FIG. 14.

Figure 16:
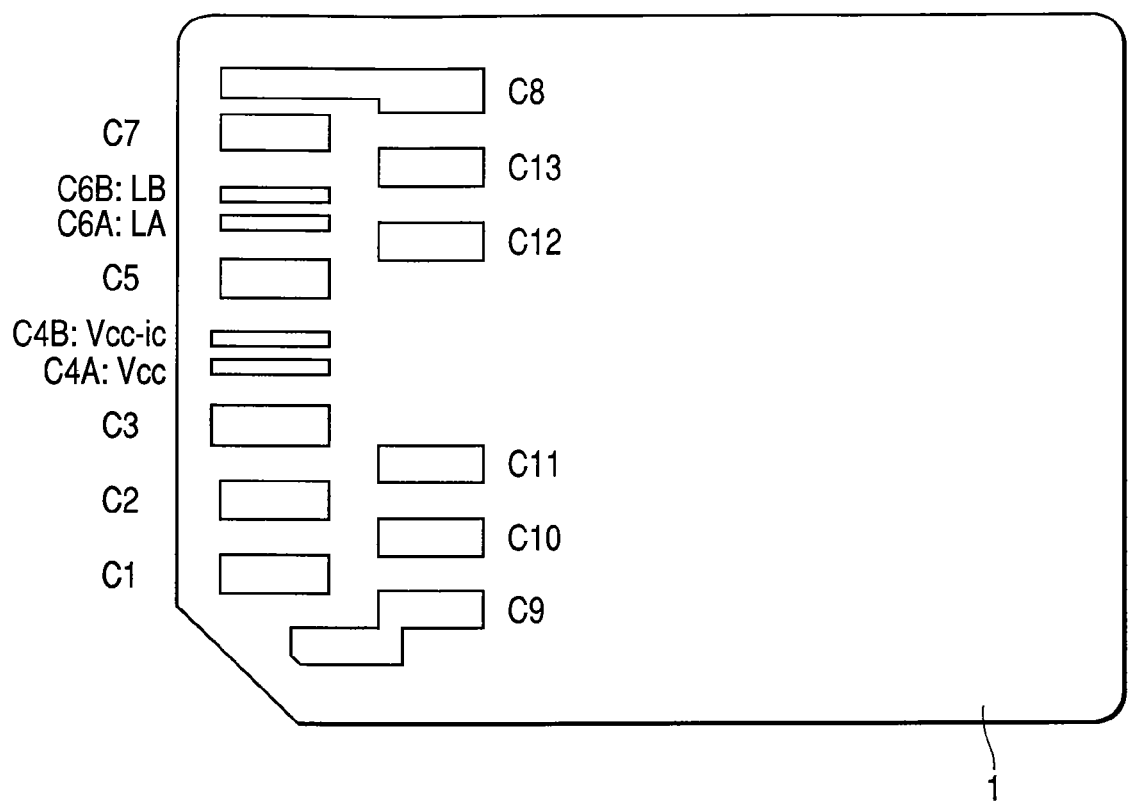
FIG. 16 is a plan view showing the pin arrangement of the memory card in which the antenna connection split pin and the power split pin are provided in a full-size package.

In an explanation of a memory card in which the antenna connecting split pin and power split pin are provided, a package has a reduced size. This explanation, however, can apply to even a full-size package that is typical of FIG. 16.

<<Dual Use of Antenna Connecting Pin>>

Instead of an antenna connecting split pin, the pin arrangement of FIG. 3 is utilized as is. The pin of C6 can also be assigned to the one antenna connecting pin LA and the pin of C8 can also be assigned to the other antenna connecting pin LB. In this case, a corresponding card host can perform external interfacing by a card controller in any one of Definition D, E, or F when the relevant memory card is inserted. In the case of the card host that performs interfacing in the correspondence of A, B, or C of FIG. 2, when the insertion of the relevant memory card is detected, the pin of C8 can be switched from data input/output into an antenna connection function.

Figure 17:
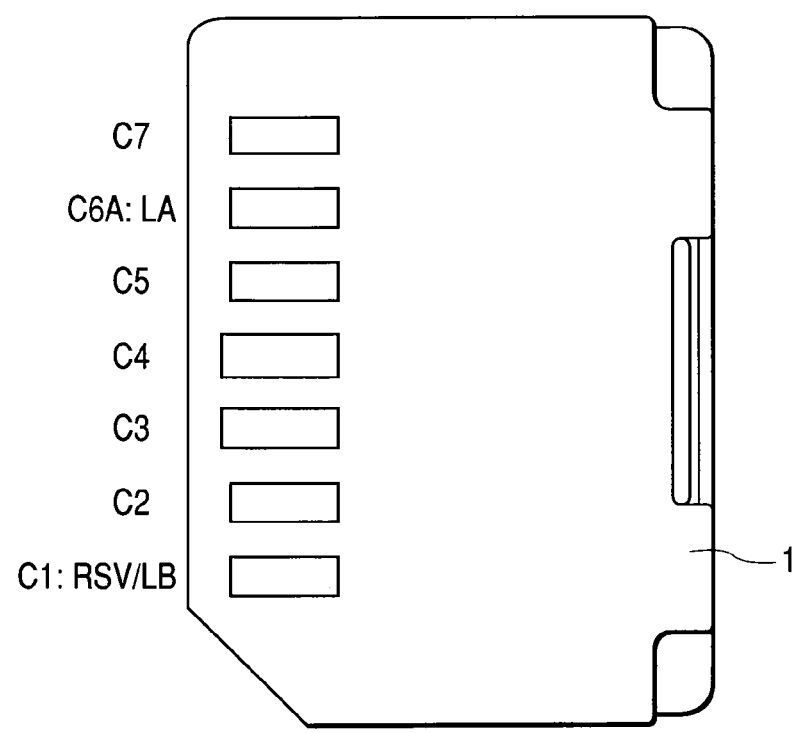
FIG. 17 is a plan view showing the pin arrangement of the memory card in which the pin of C6 is assigned to one antenna connecting pin and the pin of C1 is assigned to the other antenna connecting pin in the primitive pin arrangement of the 7-pin mode.

Moreover, in the pin arrangement of the 7-pin form of FIG. 17, the pin of C6 can be assigned to the one antenna connecting pin LA and the pin of C1 can be assigned to the other antenna connecting pin LB. In this case, a corresponding memory card can operate the relevant memory in an MMC mode when the relevant memory card is inserted. This is because the pin of C1 is a reserved pin RSV in the MMC mode.

Moreover, instead of an antenna connecting split pin, the pin of C8 in the pin arrangement of FIG. 3 can also be assigned to one antenna connecting pin LA and the pin of C9 can also be assigned to the other antenna connecting pin LB. In this case, a corresponding card host can switch the pins of C7 and C8 from data input/output to an antenna connection function when the relevant memory card is inserted.

When an existing pin also serves as an antenna connecting pin, in any case, a card host must be provided with a detection processing function for detecting the insertion of such a memory card. For example, by card recognition processing, such a memory card outputs an identification code that indicates the type of the relevant memory card utilizing the pin of C7. The card host receives the identification code and can detect the installation of the memory card that also serves as the pin. Moreover, the card host can issue a command for instructing the memory card to operate a pin shared as the antenna connecting pin of C8 as either an original data input/output pin or antenna connection pin. For example, when there is a command that is a user command or undefined command in the Standard, such a command is issued and a pin function is switched. Accordingly, for a normal operation, the pin of C8 functions as the original data input/output pin. The pin can function as an antenna pin only for the noncontact communication of an IC card microcomputer.

Figure 18:
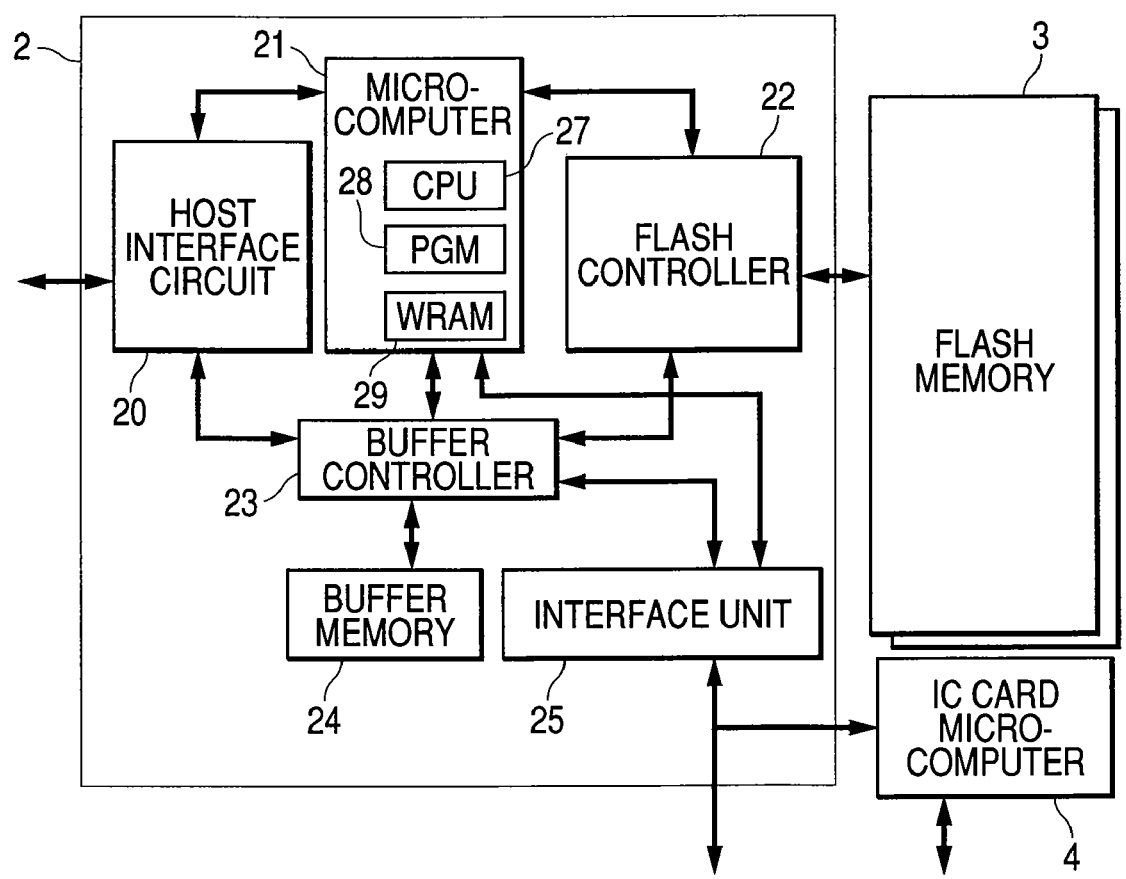
FIG. 18 is a block diagram illustrating (by example) the details of a card controller.

The detailed composition of the card controller 2 and the IC card microcomputer 4 is described below. FIG. 18 illustrates (by example) the details on the card controller 2. The card controller 2 includes a host interface circuit 20, a microcomputer 21, a flash controller 22, a buffer controller 23, a buffer memory 24, and an interface unit 25. The buffer memory 24 includes a DRAM (dynamic random access memory) or a SRAM (static random access memory). The IC card microcomputer 4 is connected to the interface unit 25. The microcomputer 21 has a CPU (central processing unit) 27, a program memory (PGM) 28 that retains the operation program of the CPU 27, and a work memory (WRAM) 29 utilized for the work area of the CPU 27. The PGM 28 retains a control program in an MMC interface control mode that corresponds to the MMC Standards.

When the host interface circuit 20 issues a memory card initialize command, the host interface circuit enables the microcomputer 21 to execute a control program of a MMC interface control mode by an interrupt. The microcomputer 21 controls an external interface operation through the host interface circuit 21 by executing the control program, and controls types of access (write, erase, and read operations) with regard to the flash memory 3 and data management by the flash controller 22. The microcomputer controls format conversion between a data format unique to a memory card and a data format common to a memory by the buffer controller 23.

The buffer memory 24 temporarily holds the data read from the flash memory 3 or the data written to the flash memory 3. The flash controller 22 allows the flash memory 3 to operate as a hard disk compatible file memory and manages data in sector units.

FIG. 19 illustrates (by example) the details of the IC card microcomputer 4. The IC card microcomputer 4 has a CPU 31, a RAM (random access memory) 32 as a work RAM, a timer 33, an EEPROM (electrically erasable and programmable read only memory) 34, a coprocessor unit 35, a mask ROM (read only memory) 36, a system control logic 37, an input/output port (I/O port) 43, a data bus 39, an address bus 40, and an RF unit 41.

The mask ROM 36 is utilized to store operation programs (encryption program, decoding program, and interface control program) of the CPU 31 and data. The RAM 32 is utilized for the work area of the CPU 31 or a temporary storage area of the data. For example, the RAM has a SRAM (static random access memory) or a DRAM (dynamic random access memory). When an IC card command is supplied to the I/O port 38, the system control logic 37 decodes this command, and allows the CPU 31 to execute a processing program required for the execution of the relevant command. That is, the CPU 31 accesses the mask ROM 36 using an address instructed from the system control logic 37 and fetches an instruction. The CPU decodes the fetched instruction and performs operand fetch and a data operation based on a decoded result. The coprocessor unit 35 performs residue operation processing in RSA encryption or an elliptic curve cryptographic operation in accordance with the control of the CPU 31. The I/O port 38 has a 1-bit I/O pin, and the pin is also used as data input/output and the input of an external interrupt signal. The I/O port 38 is coupled with the data bus 39. The CPU 31, RAM 32, timer 33, EEPROM 34, and coprocessor 35 are connected to the data bus 39. The system control logic 37 controls the operation mode and interrupt of the IC card microcomputer 4, and has a random number generation logic used for the generation of a key of cryptograph. The IC card microcomputer 4 allows the inside to be initialized when a reset operation is instructed with a reset signal RES. The CPU 31 starts the execution of an instruction from the first address of the program of the mask ROM 36. The IC card microcomputer 4 synchronizes with a clock signal CLK and is operated.

The EEPROM 34 enables erase processing and write processing electrically, and is used as an area that stores data, such as ID information or an authentication certificate, that is used for specifying an individual. Instead of the EEPROM 34, a flash memory or a ferroelectric memory can also be adopted. In this drawing, the IC card microcomputer 4 has both of a contact interface that uses an external connecting pin as an external interface and a noncontact interface that uses an antenna, but the IC card microcomputer 4 is capable of having only one interface function of the contact interface or the noncontact interface. The RF unit 41 for performing noncontact interfacing has chip antenna pins TML1 and TML2. Electric power is supplied from the RF unit 41 via the antenna, or noncontact interfacing is selected from the system control logic 37 via an internal bus. Then, the RF unit 41 generates operating power using induced electromotive force generated when the antenna intersects a predetermined electromagnetic wave (for example, a high frequency fluctuating magnetic flux or a microwave) as the operating power. The RF unit 41 generates an internal clock signal CLK, internal data, and a reset signal, respectively. The internal clock signal CLK is generated based on an induced current generated corresponding to the frequency of the electromagnetic wave. The RF unit 41 separates the internal data, which is overlapped with the electromagnetic wave and is transferred, and inputs and outputs information to and from the antenna according to a noncontact method. Preferably, the RF unit 41 that operates via the noncontact interface should have a small-scale circuit independently of the CPU 31 for the IC card operation that operates via a contact interface inside the IC card microcomputer 4. As the RF unit 41, a circuit required for the noncontact card operation, for example, a noncontact card processor, a memory used for the control program area and work area of the noncontact card processor, and an RF sending and receiving and power supply circuit unit are provided in the inside. Because the RF unit 41 has an independent small-scale circuit, such as a processor function and its control program, in this manner, for example, a circuit is operated easily by externally induced electromotive force even in the environment where power supply is not obtained via a contact pin. Moreover, the RF unit 41 can input and output data between the noncontact interface portion and contact interface portion via the internal data bus 39 and the address bus 40.

Security processing in the memory card 1 is explained. For example, user identification information is stored in the secure area of the flash memory 3. When contents data is downloaded, the user identification information can be downloaded together with license information encrypted as a private key. A decoding key for decoding the contents data is contained in the license information, and the license information is decoded using the user identification information as the decoding key. Accordingly, a copyright is protected against the contents data. Such security processing is performed by the microcomputer 21 under program control.

The security processing by the IC card microcomputer 4 is described. For example, the IC card microcomputer 4 implements a function that can be utilized for an electronic settlement service and was certified by the ISO/IEC 15408 Evaluation/Certification Authority. The EEPROM 34 retains a predetermined certificate of authentication, and sends the certificate of authentication when an authentication request is issued from a host. Meanwhile, subsequent communication processing is enabled on condition that authentication is obtained. The mask ROM 36 retains the operation program of such security processing. Desirably, from a standpoint of security, the authentication processing by the IC card microcomputer 4 should be performed inside the IC card microcomputer 4. In this point, it is better that the power supplies to the IC card microcomputer 4 only by the induced electromotive force and the IC card microcomputer 4 performs operation without the card controller 2 or the flash memory 3. When there is no security problem from the viewpoint of an application or technically, the security processing can safely be performed via the card controller 2.

For example, as described above, when the IC card microcomputer 4 can be utilized for an electronic settlement service and was certified by the ISO/IEC 15408 Evaluation/Certification Authority, the memory card 1 is inserted into a card holder for a cash card, a credit card, or a commuter pass, and each card function can be implemented using a noncontact interface.

Let it be considered that the IC card microcomputer 4 is utilized for high level security processing, such as electronic settlement. In that case, there is a high possibility of power-on reset that initializes all internal states with regard to an abnormal state of the IC card microcomputer 4 being performed frequently in comparison with the card controller 2. In consideration of this, if a dedicated power pin Vcc-ic is provided in the IC card microcomputer 4, the single IC card microcomputer 4 enables the power-on reset freely without resetting the memory card 1. Accordingly, the use of ease of the memory card 1 can be improved while warranting security. Moreover, the memory card 1 is inserted into a host device. In this condition, even when the IC card microcomputer 4 performs communication using a noncontact interface, more stable power than the operating power obtained from induced electromotive force can be obtained from the Vcc-ic. Even in a weaker electric wave condition, a single memory card can perform the communication using the noncontact interface. And the card host is capable of supplying the Vcc-ic to the IC card microcomputer 4 when the IC card microcomputer 4 performs with the power supplied by the induced electromotive force, and the card host is capable of stopping supplying the Vcc-ic usually.

Figure 20:
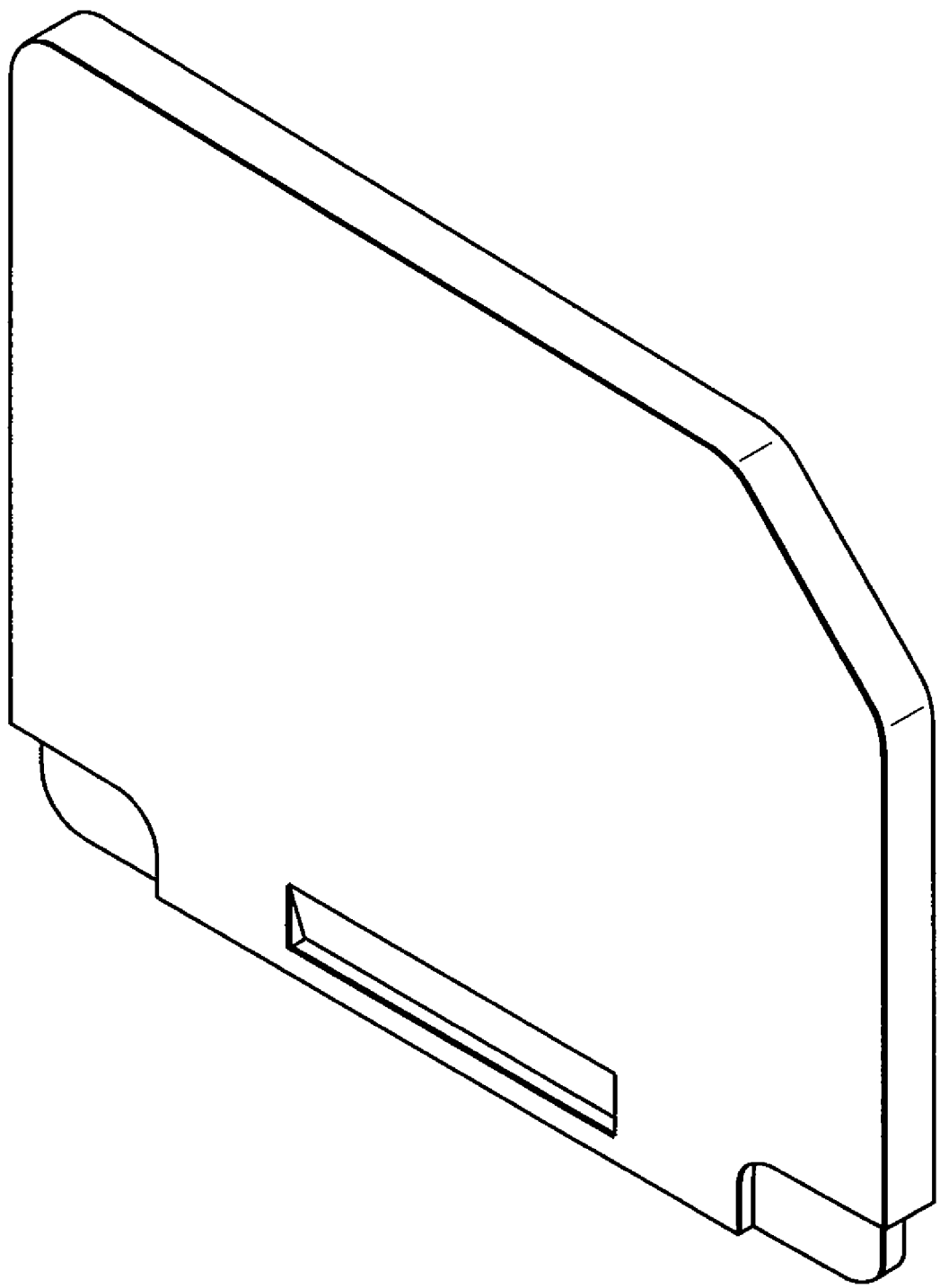
FIG. 20 is a perspective view showing a full view of a memory card 1 according to Definition B of FIG. 2.
Figure 21:
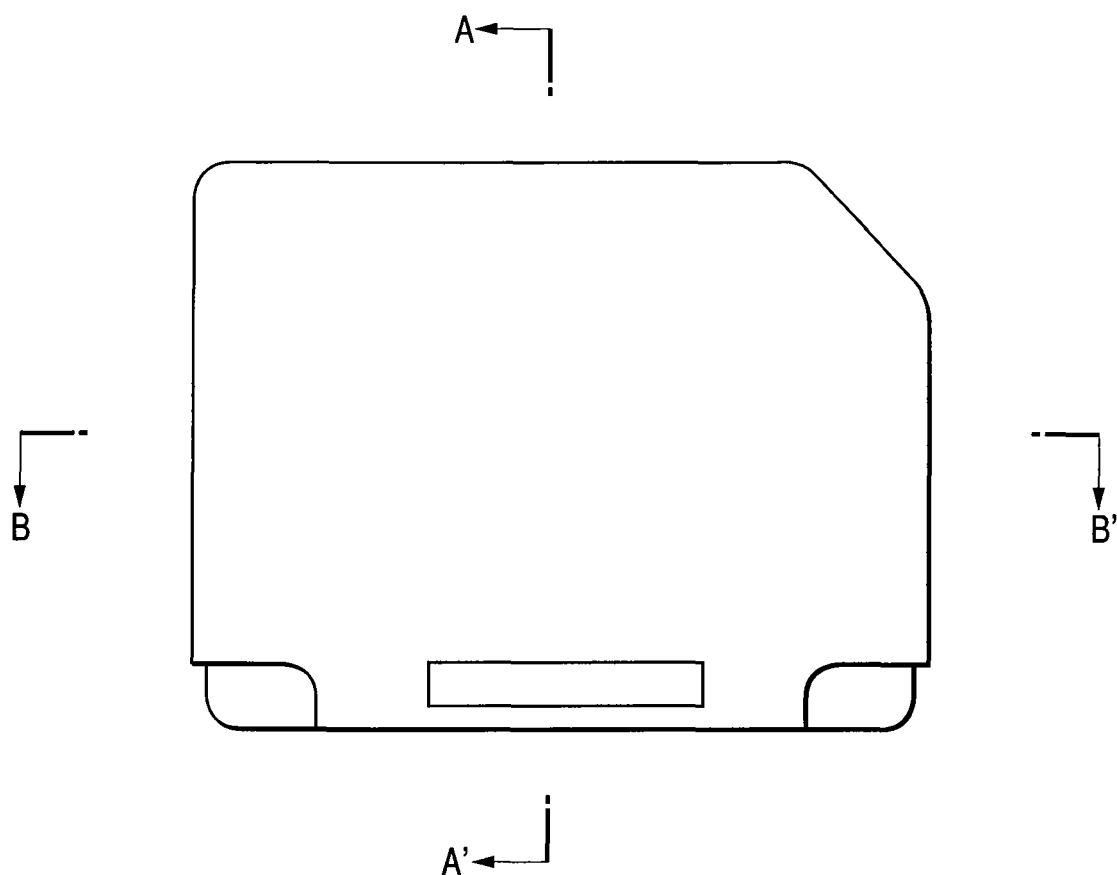
FIG. 21 is a front view showing the full view of the memory card 1 according to Definition B of FIG. 2.
Figure 22:
FIG. 22 is a right side view showing the full view of the memory card 1 according to Definition B of FIG. 2.
Figure 23:
FIG. 23 is a left side view showing the full view of the memory card 1 according to Definition B of FIG. 2.
Figure 24:
FIG. 24 is a plan view showing the full view of the memory card 1 according to Definition B of FIG. 2.
Figure 25:
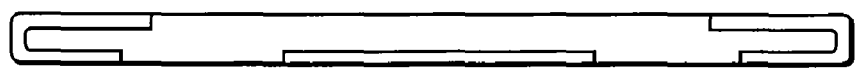
FIG. 25 is a bottom view showing the full view of the memory card 1 according to Definition B of FIG. 2.
Figure 26:
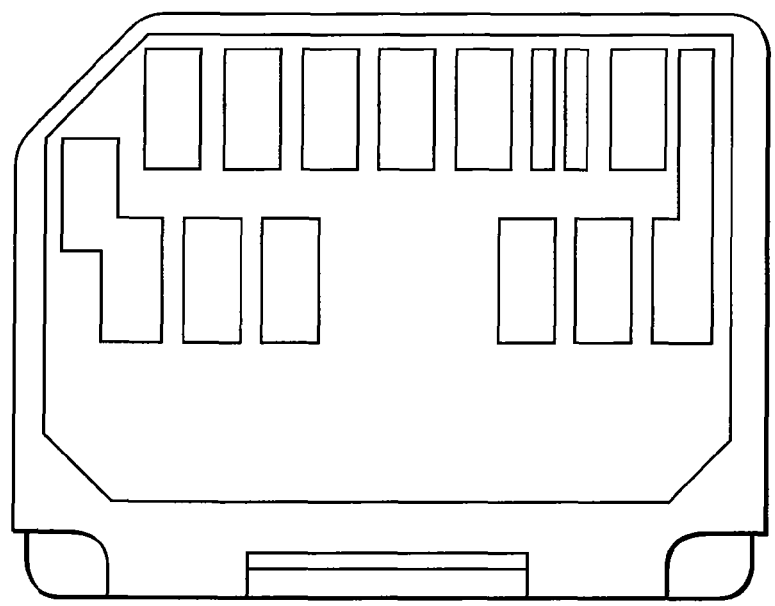
FIG. 26 is a rear view showing the full view of the memory card 1 according to Definition B of FIG. 2.
Figure 27:
FIG. 27 is a sectional view in the A-A' shown in FIG. 21.
Figure 28:
FIG. 28 is a sectional view in the B-B' shown in FIG. 21.
Figure 29:
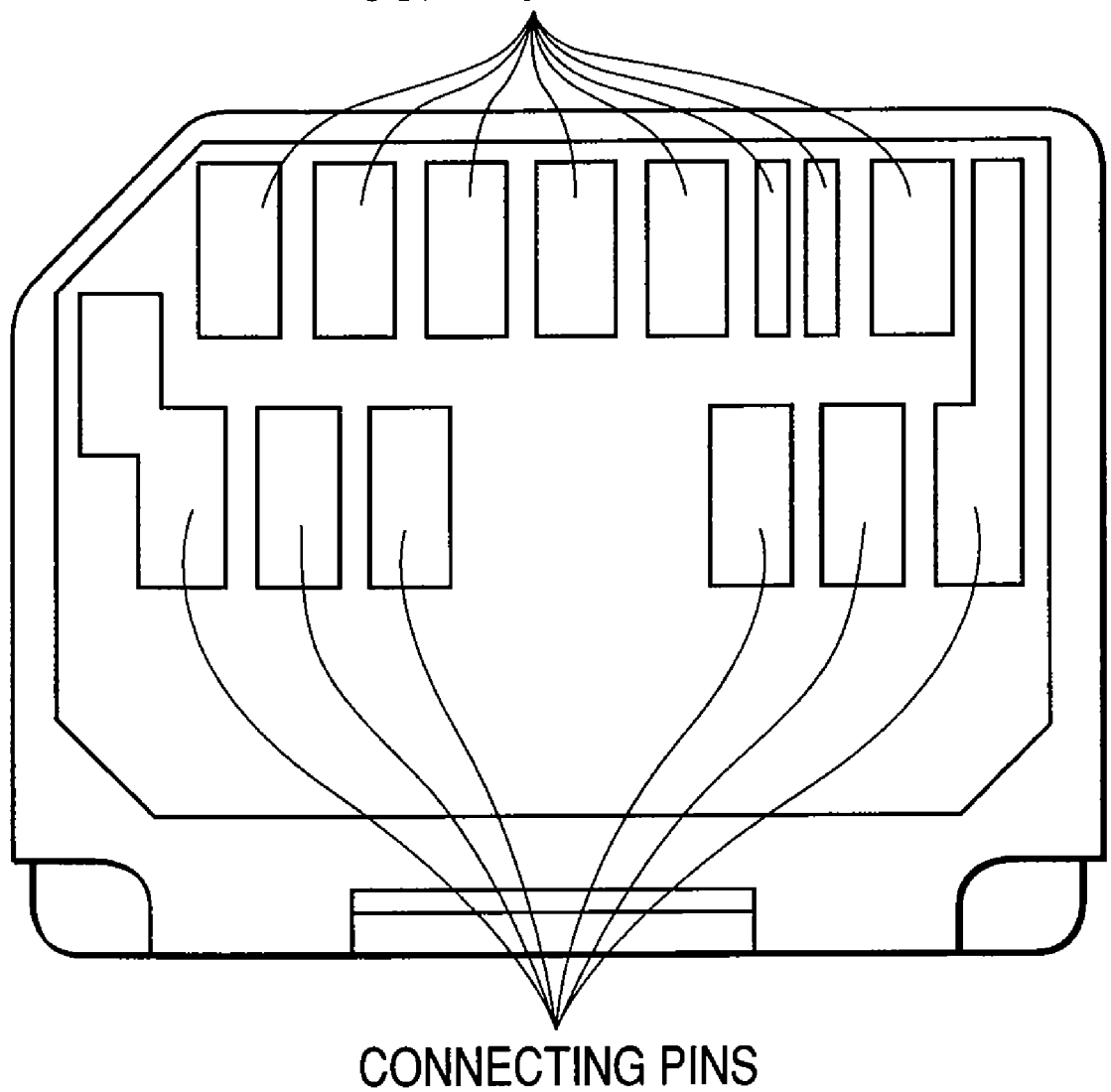
FIG. 29 is a reference drawing showing a name of a pin in the rear view of FIG. 26.

FIG. 20 through FIG. 29 show a full view of the memory card 1 according to Definition B of FIG. 2. FIG. 20 is a perspective illustration. FIG. 22 is a right side view. FIG. 23 is a left side view. FIG. 24 is a plan view. FIG. 25 is a bottom plan view. FIG. 26 is a rear elevation. FIG. 27 is a sectional view in the A-A' shown in FIG. 21. FIG. 28 is a sectional view in the B-B' shown in FIG. 21. FIG. 29 is a reference drawing showing the name of each unit.

An invention performed by the inventors was specifically described above based on an embodiment. Needless to say, however, the present invention is not limited to the embodiment, but the invention may be modified variously in the scope where the invention does not departing from the subject matter.

For example, the present invention can apply widely to a memory card of a multifunction mode conforming to other standards as well as the memory card of the MMC Standards. Accordingly, the function and arrangement of an external connecting pin, and the number of external connecting pins can be modified optionally. Moreover, a nonvolatile memory is not limited to a flash memory, but can be a memory of another storage format, such as a ferroelectric memory. An IC card microcomputer is not limited to a security controller in which the function certified by the ISO/IEC 15408 Evaluation/Certification Authority is implemented. The IC card microcomputer can also be a microcomputer that enables communication encrypted by performing mere encryption/decoding.

Moreover, the block diagrams of FIG. 5, FIG. 6, FIG. 8, FIG. 10, FIG. 12, and FIG. 15 are solely drawn aiming principally at showing the external interface function of a memory card. Each external signal pin is shown as if it were used exclusively for either the card controller 2 or the IC card microcomputer 4 and connected. Actually, one memory card can select an external interface from several types of interface modes, for example, one mode from the pin modes B and C of FIG. 2. In the case of such a memory, for example, the pins of C10 to C13 can be connected to both the card controller 2 and the IC card microcomputer 4.

What is claimed is:

1. A memory card, comprising:
a card controller;
a nonvolatile memory connected to said card controller;
an IC card microcomputer;
a first potential supply pin and a second potential supply pin, each as a power pin;
a command pin to supply a command that instructs said card controller on an operation or checks a state;
a data pin for data input/output;
a clock pin for input of a clock signal; and
two antenna connecting pins,
wherein the IC card microcomputer inputs and outputs data from an antenna connected to said antenna connecting pins.

2. A memory card, comprising:
a card controller;
a nonvolatile memory connected to said card controller;
an IC card microcomputer;
a first potential supply pin that supplies a first potential and a second potential supply pin that supplies a second potential to said card controller and said nonvolatile memory, respectively;
a third potential supply pin that supplies a third potential to said IC card microcomputer;
a command pin to supply a command that instructs said card controller regarding an operation;
a data pin for data input/output;
a clock pin for input of a clock signal; and
two antenna connecting pins,
wherein the IC card microcomputer inputs and outputs data to and from an antenna connected to said antenna connecting pins.

3. The memory card according to claim 2,
wherein said two antenna connecting pins are arranged adjacent to each other, and
wherein a distance between said two antenna connecting pins is less than a distance between a first one of the antenna connecting pins and another pin adjacent to the first antenna connecting pin.

4. The memory card according to claim 2, wherein an area of said two antenna connecting pins is smaller than an area of said another pin.

5. The memory card according to claim 2,
wherein each of said antenna connecting pins has a length in a first direction and a width in a second direction orthogonal to the first direction, and
wherein said another pin has a length in the first direction equal to or greater than the length of the antenna connecting pins and a width wider than the width of the antenna connecting pins.

6. The memory card according to claim 5, further comprising:
a first pin column along a first side of said memory card; and
a second pin column along a second side opposite said first side with regard to said first pin column,
wherein said two antenna connecting pins are arranged in said first pin column.

7. A memory card, comprising:
a card controller;
a nonvolatile memory connected to said card controller;
an IC card microcomputer;
a first potential supply pin that supplies a first potential and a second potential supply pin that supplies a second potential to said card controller and said nonvolatile memory, respectively;
a third potential supply pin that supplies a third potential to said IC card microcomputer;
a command pin to input a command that instructs said card controller regarding an operation, and to output a reply to the command;
a data pin to input and output data stored or to be stored in said nonvolatile memory and to input an address that specifies an access destination for the nonvolatile memory; and
two antenna connecting pins to connect an antenna used for data input/output of said IC card microcomputer,
wherein second and third potentials are respectively supplied from said second potential supply pin and said third potential supply pin when data is input and output to and from said IC card microcomputer via said antenna in a state in which said nonvolatile memory is not accessed.

8. The memory card according to claim 7, wherein the memory card operates by electric power supplied from said antenna if data is input and output to and from the IC card microcomputer via said antenna as well as if it is detected that second and third potentials are not supplied from said second potential supply pin and said third potential supply pin, respectively.

* * * * *